United States Patent
Amir et al.

(10) Patent No.: US 10,877,001 B2
(45) Date of Patent: Dec. 29, 2020

(54) MULTI-PHASE FLOW-MONITORING WITH AN OPTICAL FIBER DISTRIBUTED ACOUSTIC SENSOR

(71) Applicants: Silixa Ltd., Elstree (GB); Chevron U.S.A. Inc., San Ramon, CA (US)

(72) Inventors: Mohammad Amir, Elstree (GB); Mahmoud Farhadiroushan, Elstree (GB); Daniel Finfer, Elstree (GB); Veronique Mahue, Elstree (GB); Tom Parker, Elstree (GB)

(73) Assignees: CHEVRON U.S.A. INC., San Ramon, CA (US); SILIXA LTD., Elstree (GB)

( * ) Notice: Subject to any disclaimer, the term of this patent is extended or adjusted under 35 U.S.C. 154(b) by 153 days.

(21) Appl. No.: 15/749,977

(22) PCT Filed: Aug. 5, 2016

(86) PCT No.: PCT/GB2016/052444
§ 371 (c)(1),
(2) Date: Feb. 2, 2018

(87) PCT Pub. No.: WO2017/021740
PCT Pub. Date: Feb. 9, 2017

(65) Prior Publication Data
US 2018/0231498 A1    Aug. 16, 2018

(30) Foreign Application Priority Data
Aug. 5, 2015   (GB) .................................. 1513867.0

(51) Int. Cl.
*G01N 29/024* (2006.01)
*G01N 29/24* (2006.01)
(Continued)

(52) U.S. Cl.
CPC ........... *G01N 29/024* (2013.01); *G01F 1/661* (2013.01); *G01F 1/666* (2013.01); *G01F 1/708* (2013.01);
(Continued)

(58) Field of Classification Search
CPC .................................................... G01N 29/024
(Continued)

(56) References Cited

U.S. PATENT DOCUMENTS 5,455,516 A * 10/1995 Jean ...................... G01N 22/04
                                                                324/639
7,328,113 B2   2/2008 Rothman et al.
(Continued)

FOREIGN PATENT DOCUMENTS

GB        2521661 A     7/2015
WO    2010136810 A2    12/2010
(Continued)

OTHER PUBLICATIONS

Intellectual Property Office, Patents Act 1977: Search Report under Section 17(5) for Application No. GB1513867.0, dated Feb. 2, 2016.
(Continued)

*Primary Examiner* — Walter L Linsay, Jr.
*Assistant Examiner* — Philipmarcus T Fadul
(74) *Attorney, Agent, or Firm* — Honigman LLP; Brandon C. Griffith; Jonathan P. O'Brien

(57) ABSTRACT

Embodiments of the invention provide a "tool-kit" of processing techniques which can be employed in different combinations depending on the circumstances. For example, flow speed can be found using eddy tracking techniques, or by using speed of sound measurements. Moreover, composition can be found by using speed of sound measurements and also by looking for turning points in the k-ω curves,
(Continued)

particularly in stratified multi-phase flows. Different combinations of the embodiments can therefore be put together to provide further embodiments, to meet particular flow sensing requirements, both on the surface and downhole. Once the flow speed is known, then at least in the case of a single phase flow, the flow speed can be multiplied by the interior cross-sectional area of the pipe to obtain the flow rate. The mass flow rate can then be obtained if the density of the fluid is known, once the composition has been determined.

4 Claims, 16 Drawing Sheets

(51) Int. Cl.
    G01F 1/66      (2006.01)
    G01N 29/46     (2006.01)
    G01F 1/74      (2006.01)
    G01F 1/708     (2006.01)
(52) U.S. Cl.
    CPC ........... G01F 1/74 (2013.01); G01N 29/2418 (2013.01); G01N 29/46 (2013.01); G01N 2291/0222 (2013.01); G01N 2291/02433 (2013.01); G01N 2291/02809 (2013.01); G01N 2291/02836 (2013.01)
(58) Field of Classification Search
    USPC ........................................ 73/19.03
    See application file for complete search history.

(56) References Cited

U.S. PATENT DOCUMENTS

| | | |
|---|---|---|
| 2004/0173010 A1 | 9/2004 | Gysling et al. |
| 2005/0171710 A1 | 8/2005 | Gysling et al. |
| 2007/0038391 A1 | 2/2007 | Gysling et al. |
| 2008/0066559 A1 | 3/2008 | Johansen et al. |
| 2008/0208483 A1* | 8/2008 | Loose ............... G01F 1/666 702/22 |
| 2011/0301877 A1* | 12/2011 | Wee ............... G01F 1/74 702/47 |
| 2012/0060615 A1 | 3/2012 | Farhadiroushan et al. |
| 2014/0126325 A1* | 5/2014 | Farhadiroushan ..... G01V 11/00 367/35 |
| 2014/0163889 A1 | 6/2014 | Finfer et al. |
| 2014/0202240 A1 | 7/2014 | Skinner et al. |
| 2015/0021015 A1 | 1/2015 | Xiao |

FOREIGN PATENT DOCUMENTS

| | | |
|---|---|---|
| WO | 20100136809 A2 | 12/2010 |
| WO | 2014068334 A1 | 5/2014 |

OTHER PUBLICATIONS

European Patent Office as the International Searching Authority, Search Report and Written Dpinion for International Application No. PCT/GB2016/052444, dated Nov. 14, 2016.

Fastl, Hugo, "Psycho-Acoustics and Sound Quality" in "Comminication Acoustics", Dec. 5, 2005, Springer-Verlag, Berlin/Heidelberg, XP055315000, ISBN: 978-3-540-22162-3, pp. 139-162.

Acoustics Research Centre, School of Computing & Engineering, "Sound quality-making sound better, Roughness-fluctuation strength" Univerity of Salford, retrieved from the internet on Feb. 1, 2018, <http://www.salford.ac.uk/computing-science-engineering/research/acoustics/psychoacoustics/sound-quality-making-products-sound-better/sound-quality-testing/roughness-fluctuation-strength>.

Wikipedia the Free Encyclopedia, Skewness, Last edited on Dec. 2, 2017, retrieved from the internet on Feb. 1, 2018, <https://en.wikipedia.org/wiki/Skewness>.

European Patent Office, Communication pursuant to Article 94(3) EPC for Application No. 16750240.0, dated Jun. 18, 2019.

Yuliya Semenova and Gerald Farrell, "Optical Fiber Sensors, Advanced Techniques and Applications," Excerpt from Chapter 2: Optical Fiber Sensing Solutions: From Macro-to Micro-/Nanoscale, Version date: Oct. 1, 2014, edited by Ginu Rajan, Published 2015, Taylor & Francis Group, LLC, ISBN 978-1-4822-2825-0.

Institute of Industrial Property (Brazil) (Instituto Nacional DA Propriedade Industrial), Office Action for BR Application No. BR112018002195-4, dated May 20, 2020.

* cited by examiner

MULTI-PHASE FLOW-MONITORING WITH AN OPTICAL FIBER DISTRIBUTED ACOUSTIC SENSOR

CROSS-REFERENCE TO RELATED APPLICATIONS

This application claims priority under 35 U.S.C. § 371 to Patent Cooperation Treaty Application No. PCT/GB2016/052444, filed Aug. 5, 2016, which claims the benefit of earlier-filed British Application No. GB 1513867.0, filed Aug. 5, 2015, the entire contents of which are incorporated herein by reference.

TECHNICAL FIELD

The present invention relates to a method and system for undertaking multi-phase flow detection and monitoring in fluid carrying vessels using an optical fiber distributed acoustic sensor system.

BACKGROUND TO THE INVENTION AND PRIOR ART

Optical fibre based distributed acoustic sensors (DAS) are known in the art. One high performance example is the iDAS™, available from Silixa Limited, of Elstree, UK. Further details of the operation of a suitable DAS are given in WO2010/0136809 and WO2010/136810, which also disclose that distributed acoustic sensors may be used for in-well applications, in that the acoustic noise profile can be used to measure the flow by noise logging at every location along the well. In addition, the noise spectrum can be used to identify the phase of the fluid.

Our earlier application WO2014/068334 also relates to flow monitoring, and in particular describes how fluid flow speed can be found in a single phase flow by acoustically illuminating the flow with acoustic energy, and using the DAS to record the acoustic energy as it travels along the pipe or other fluid carrying structure. In this case the flow speed is found by monitoring the speed of sound within the flow in both directions, and then using Doppler techniques to find the speed of fluid flow. In particular, because the propagating medium is flowing, Doppler shifts occur in the speed of sound energy moving in opposite directions along the pipe, with the upstream sound energy being slowed by the flow movement in the opposite direction, and the downstream sound energy being accelerated. By monitoring the speed of sound in both directions and determining the Doppler shift, the flow speed can then be found.

However, many flows are not single phase, but are instead two-, three-, or more phase, with mixtures of liquids, gases, and solids. Moreover, the phases may be heavily mixed to provide homogenous mixed flow, or may be relatively well separated, providing inhomogenous flow, each of which provides its own challenges for acoustic flow metering using an optical fiber DAS.

SUMMARY OF THE INVENTION

One embodiment provides a method of monitoring multi-phase flow in a structure, comprising: receiving a set of distributed acoustic data obtained by a distributed acoustic sensor arranged to monitor the structure; from the distributed acoustic data, determining speed of sound measurements in the flow; applying the determined speed of sound measurements to predetermined look-up data relating speed of sound to multi-phase composition to determine the composition of the flow.

A further embodiment provides a method of monitoring multi-phase flow in a structure, comprising: receiving a set of distributed acoustic data obtained by a distributed acoustic sensor arranged to monitor the structure; from the distributed acoustic data, determining speed of sound measurements in the flow in directions with the flow and against the flow; from the determined speed of sound measurements, determine a Doppler shift in the speed of sound dependent on the flow; from the Doppler shift, determine the flow speed.

A further embodiment provides a method of monitoring multi-phase flow in a structure, comprising: receiving a set of distributed acoustic data obtained by a distributed acoustic sensor arranged to monitor the structure; from the distributed acoustic data, tracking one or more eddies in a flow in the structure via a change in hoop strain exerted on the structure by the eddy; and correcting the speed of a tracked eddy via a predetermined function to find the actual flow speed. Additionally, in cases where multiple eddy speeds can be identified, a predetermined function can be used to find the actual flow speeds. In the absence of any predetermined functions, the relative changes in tracked eddy speed can be directly related to changes in flow speed.

In one embodiment the method calculates the speed of sound in one or more parts of the structure or in the fluid from the acoustic data. As such, embodiments of the invention may be used for both fluid phase determination, as well as structural integrity checking.

In another embodiment the stored or sensed data may be used to determine properties of fluid flow in the structure from the acoustic data. In one preferred embodiment the properties include the speed of fluid flow in the structure. As such, this embodiment may be used for fluid flow monitoring purposes.

For example, in one embodiment the method uses the stored acoustic data to calculate the speed of sound in the fluid from the acoustic data. In another embodiment the stored or sensed data may be used to calculate the speed of fluid flow in the structure from the acoustic data.

In one embodiment a processor is provided that is arranged to plot the acoustic data as a two dimensional space-time image. The processor then applies a two dimensional Fourier transform to the space-time image to obtain a transformed image. Gradients may then be identified in the transformed image, the identified gradients corresponding to the speed of sound, or at least a property or derivative thereof, of the coupled acoustic energy.

In one embodiment the identified gradients indicate the speed of sound in opposite directions along the flow carrying structure. This allows the processor to calculate the fluid flow in dependence on a difference between the respective speeds of sound in the fluid in the opposite directions.

Further features and aspects of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

Overview of Embodiments

Several embodiments of the invention will be described, starting with single phase flow, and progressing through to multi-phase flows of different types. In particular, the embodiments of the invention provide a "tool-kit" of processing techniques which can be employed in different combinations depending on the circumstances. For example, flow speed can be found using eddy tracking techniques as will be described, or by using speed of sound measurements. Moreover, composition can be found by using speed of sound measurements and also by looking for turning points in the k-ω curves (indicative of modal cut-off frequencies), particularly in separated multi-phase flows (including stratified and core-annular flows). Different combinations of the embodiments to be described can therefore be put together to provide further embodiments, to meet particular flow sensing requirements, both on the surface and downhole. Once the flow speed is known, then at least in the case of a single phase flow, the flow speed can be multiplied by the interior cross-sectional area of the pipe to obtain the flow rate. The mass flow rate can then be obtained if the density of the fluid is known, for example once the composition has been determined.

A. Single Phase Measurements

Figure 1:
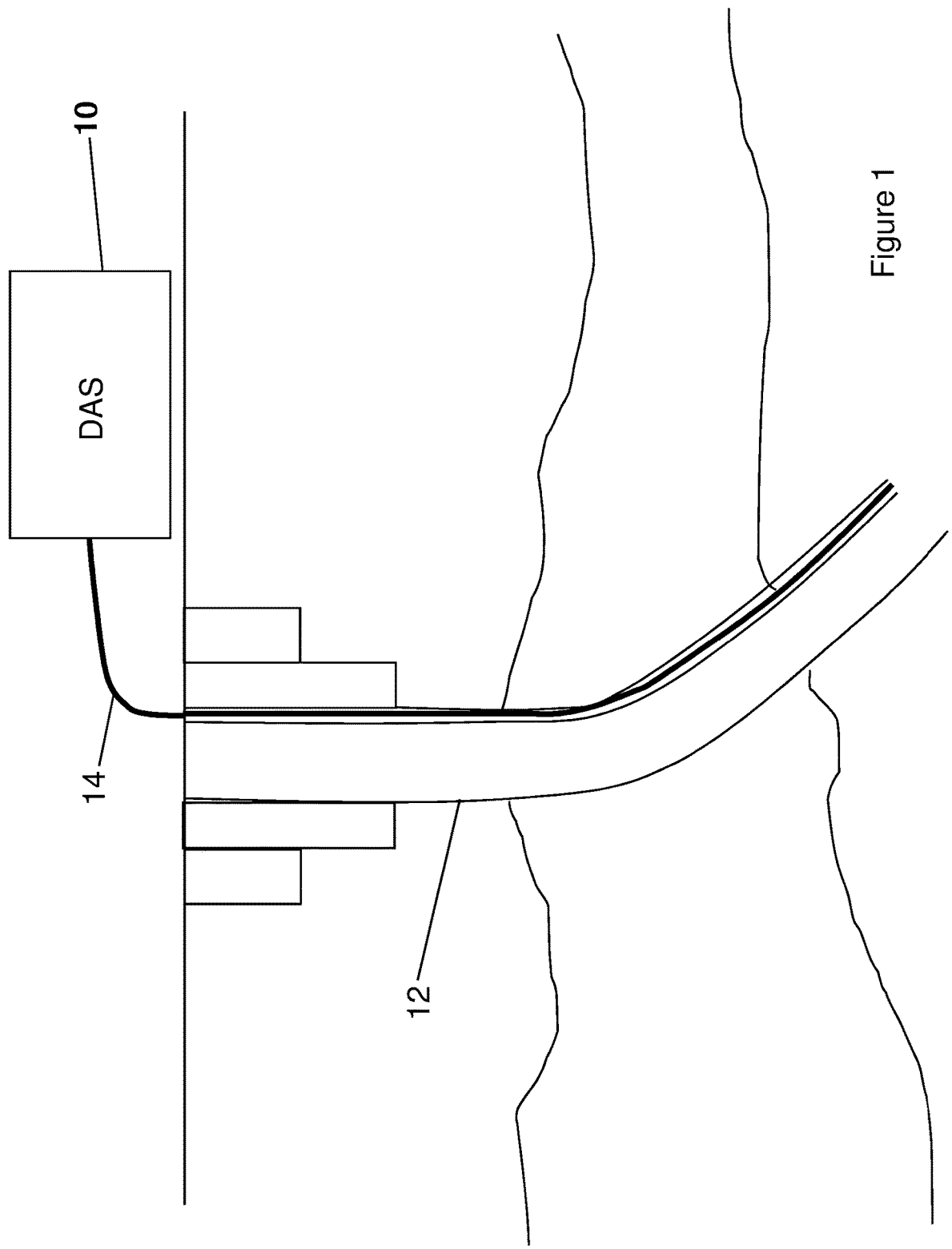
FIG. 1 is a diagram illustrating an example DAS deployment of the prior art.

1) Determination of Fluid Flow and Composition in Single Phase Flow Using Speed of Sound FIG. 1 illustrates a typical DAS deployment in an oil well, by way of example. The well 12 extends through rock strata as shown, and a fibre optic cable 14 is provided running along the length of the well, in this case substantially parallel thereto. In other embodiments the cable may extend along the well in a different manner, for example wrapped around elements of the well. In this respect, all that is important is that there is a known relationship between the different parts of the cable and the different parts of the well. Moreover, whilst shown here as a downhole application, the techniques to be described can be used exactly the same in above-surface applications, where a pipe or other fluid carrying vessel is above the surface, and the optical fiber 14 runs therealong or in other configurations. For example, the fibre may run along or inside or around the pipe whilst measuring but may need to run around obstructions etc in between measurement sections. This is considering the practical application of maybe 10 measurement sections along a pipeline.

Figure 2:
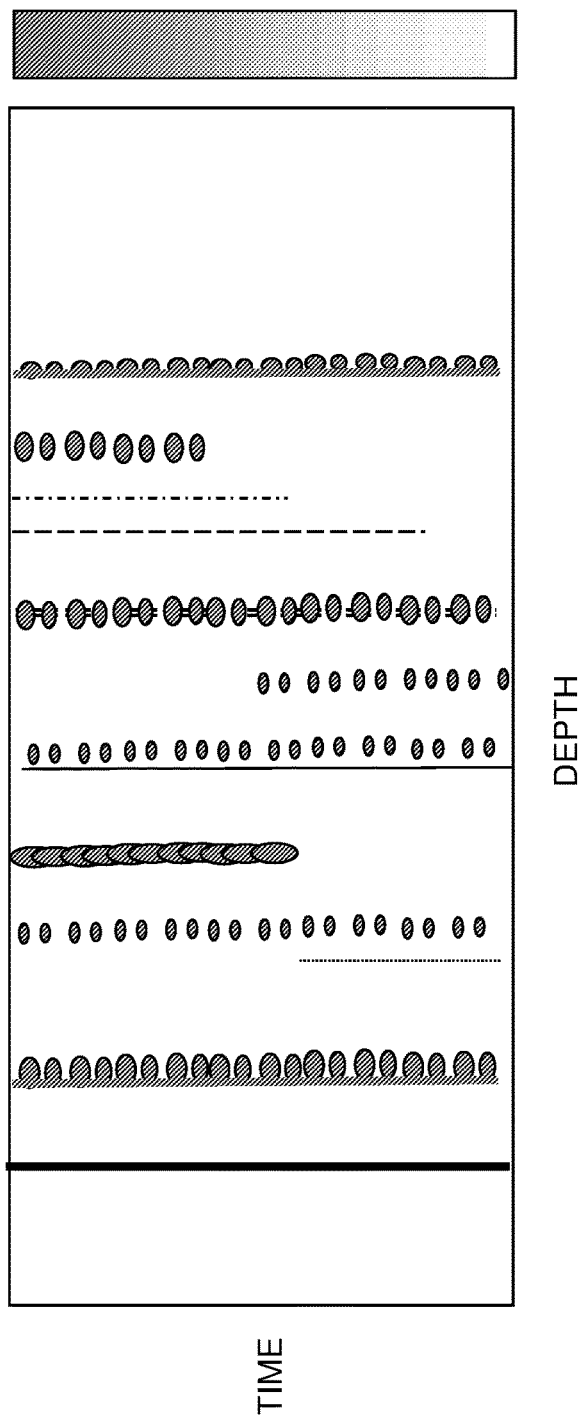
FIG. 2 is a drawing of an example space-time plot of the data collected by a DAS in a deployment like that of FIG. 1.

The fibre optic cable 14 is connected to a distributed acoustic sensor (DAS), such as the Silixa Ltd iDAS™, referenced previously. The DAS is able to record sound incident on the cable at between 1 m and 5 m resolution along the whole length of the cable, at frequencies up to around 100 kHz. Hence, monitoring of the well with the DAS results in a large amount of data, that may be represented by a two dimensional space-time plot, an example of which is shown in FIG. 2. Here, the horizontal axis shows "depth", or distance along the cable, and the left hand vertical axis shows time. The right hand vertical axis shows a colour chart, with different colours representing sound of different intensity. Hence, the 2D space time plot provides a visual record of where on the cable sound was heard, and at what measurement time.

Figure 3:
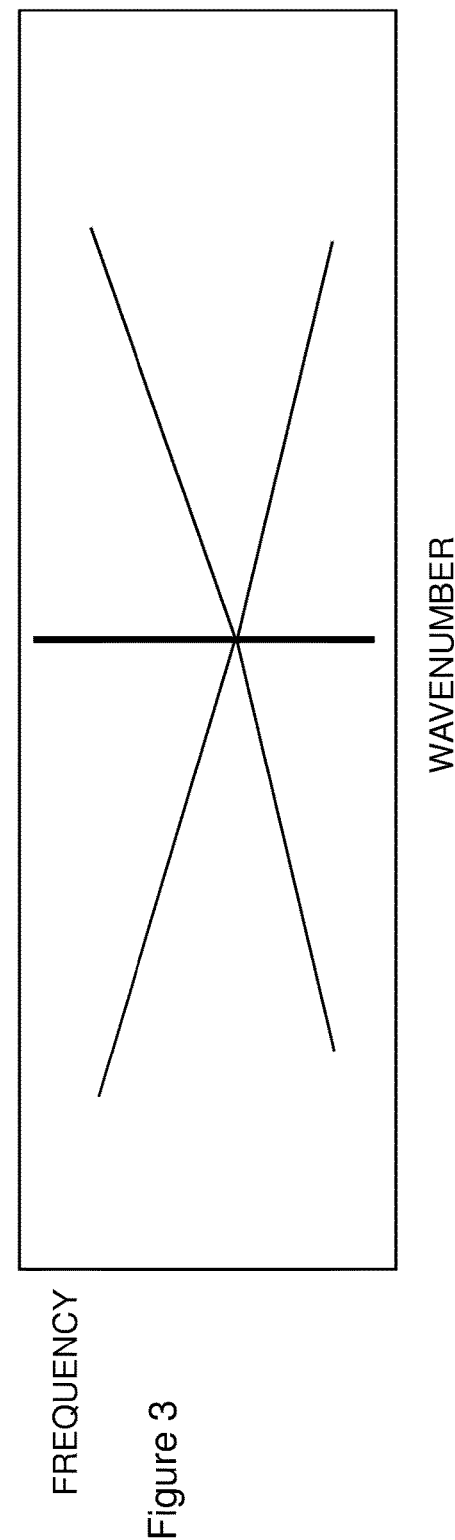
FIG. 3 is a drawing of a 2D Fourier transform (kω plot) of the space-time plot of FIG. 2.

In more detail, the DAS system can measure the phase of the acoustic signal coherently along the fibre optic cable. Therefore, it is possible to use a variety of methods to identify the presence of propagating acoustic waves. In one such method, described solely by way of non-limiting example, digital signal processing can transform the time and linear space (along the well) into a diagram showing frequency (ω) and wavenumber (k) in k-ω space. A frequency independent speed of sound propagation along the well will show up as a line in k-ω space. FIG. 2 shows the time and space signal and FIG. 3 shows the corresponding k-ω space. Using the data in FIG. 3, a good fit for the speed of sound can be calculated, by determining the gradient of the diagonal lines. The frequency band over which the speed of sound can be determined is more than sufficient for compositional and flow characterization. With the DAS system the speed of sound can be evaluated over a large section of the well and, therefore, measure the distributed variations of the flow composition and characteristics along the well. The technique is particularly powerful for determining the composition of the flow—for example, gas has a speed of sound of around 600 m/s whereas water has a speed of sounds around 1500 m/s.

Figure 4:
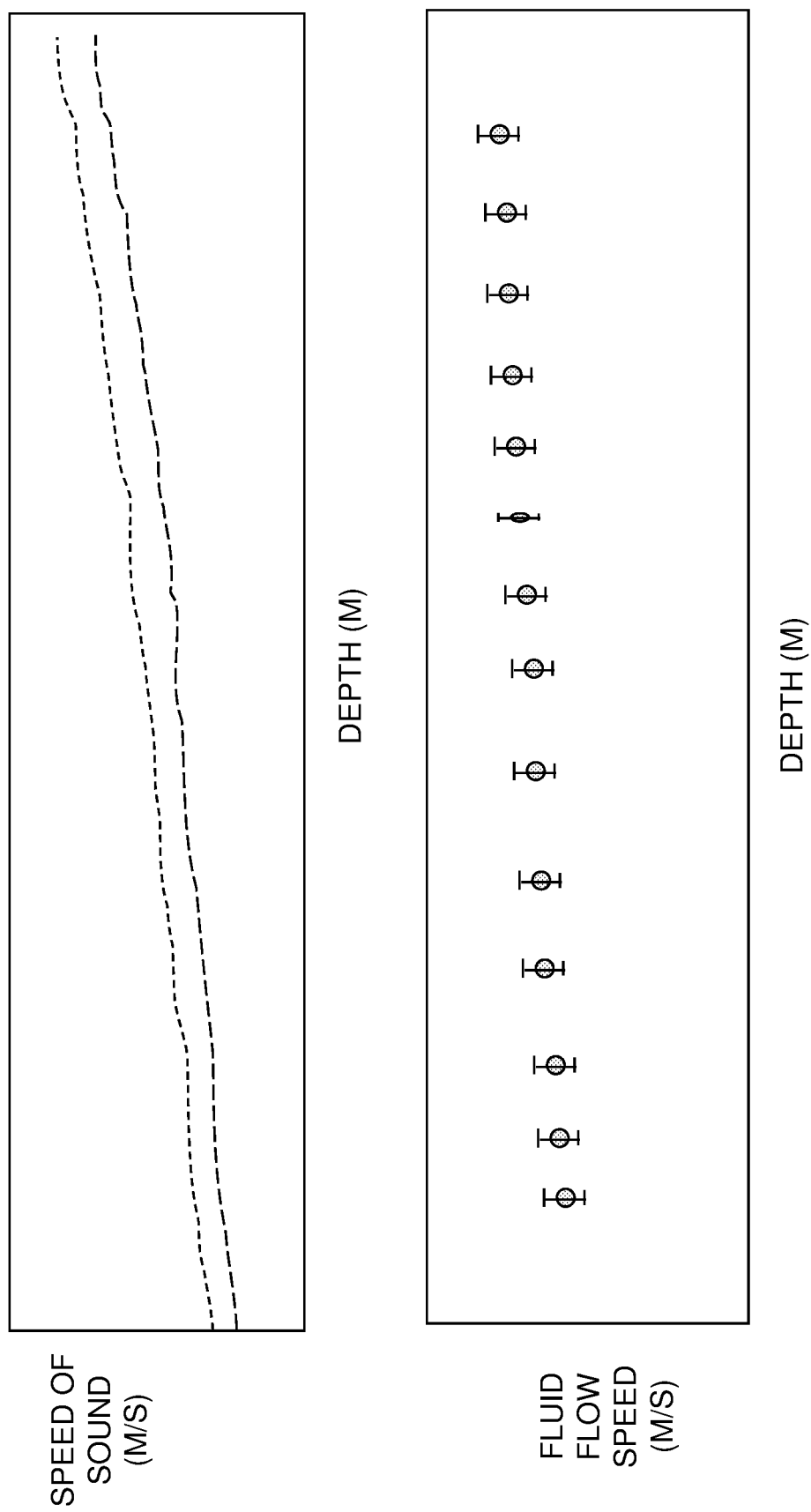
FIG. 4 is a graph showing upwards and downwards speed of sounds in a pipe, (top) together with calculated Doppler shifts (bottom) that provide fluid velocity measurements.

Using such k-ω analysis the speed of sound can also be determined throughout the entire length of the well. Importantly, each of the two diagonal lines shown in the k-ω space of FIG. 3 corresponds to the speed of sound either travelling up or down the well. These two lines can be analysed to reveal the Doppler-shifted sound speeds for upward and downward propagating sound within the fluid of interest. FIG. 4 shows the distributed flow determined in a gas injector based on Doppler shift measurements for a 30 s sampling. The determined flow speed varies with depth in the well corresponding to the change in hydrostatic pressure for a section of tubing with a uniform inner dimension and a gradually sloped well trajectory. In total the instantaneous and locally determined flow is roughly within +/−0.3 m/s (that for this well is 10%) of the actual flow speed. The match to reference measurements is within the uncertainties of an instantaneous measurement, the fluid property and the distribution of the pressure drop within the well.

In further detail, it is possible to estimate the speed of a given flow by monitoring the speeds of sound within that flow. In this analysis, it is assumed that the flow direction is coincident with the array layout (e.g. the direction of arrival for acoustic signals is known to be 0 or 180 degrees). The main principle used is that any sound contained within the flow reaches each consecutive sensor with a certain delay. Knowledge of the spatial sampling (i.e. the distribution of the cable along the well) can be used to calculate speed of sound by taking the ratio of average inter-sensor time difference of arrival and the average spatial distance between sensors. This operation can be easily done in the frequency domain. To perform this operation, in one embodiment one constructs a space-time plot of the signal across a neighbourhood of sensors. The 2D Fourier Transform of information this will give a wavenumber-frequency (k-ω) plot.

If the speed of sound is constant across all frequencies (i.e. there is no dispersion) then each angular frequency (ω) of a signal will correspond to a certain wavenumber (k) on the k-ω plot. Thus ideally a space-time signal will be mapped into a single straight line on the k-ω plot. From the wave equation we know that kc=w/2π, where c is the speed of sound. So estimating the slope of the line of highest energy on the k-ω plot will give us the speed of sound in the medium.

Since the waveguide can sustain propagation both along and against the direction of flow, the k-ω plot can show two slopes for each mode of propagation: one positive and one negative. As the slope of each of these lines indicates the sound speed in each direction, the Doppler method can be used to derive the speed of sound from the 2D FFT according to the well-known method of analysis below.

$$c+=c+v \text{[speed of sound along the flow]}$$

$$c-=c-v \text{[speed of sound against the flow]}$$

c+ and c− are found as slopes on a k-ω plot. Combination of the two equations above gives the flow speed as v=(c+−c−)/2.

Please note that whilst the above description makes use of processing using k-ω plots, in other embodiments different processing may be undertaken to achieve the same results, and not all embodiments of the invention are required to use the k-ω techniques described.

In summary, flow monitoring via DAS may be performed using the following steps. A fiber optic cable is first mechanically coupled to a pipe. The signal is then recorded, and analyzed for sound speed in the frequency-wavenumber (f-k) (i.e. k-ω) domain (Gray, 1980). By analyzing the f-k output, the sound speed in the upstream- and downstream-travelling directions can be determined. The two fluid-borne sound speeds can then be compared to each other, and the Doppler principle can be applied to extract the flow speed. Further, by comparing the expected sound speeds to those expected for the environment, it is possible to analyze fluid composition characteristics. With such an arrangement, therefore, by tracking the speed of sound as it moves along the fluid carrying structure within the single phase fluid, both the flow speed can be found using the Doppler techniques described, as well as the fluid composition, based on the measured speed of sound, and mapping the speed of sound against expected properties of known fluids, for example oil, or water.

In the case of single phase flow, speed of sound data can be useful for several reasons. The sound speed function for many fluids is well-known to be a function of the bulk modulus and the flow density. In the case where some thermodynamic quantities concerning the flow may be known, then the speed of sound can be used to resolve uncertainty regarding unknowns. For instance, consider the case of single phase ideal gases where the speed of sound can be shown to be related to $(\gamma RT)/2$ where γ is the adiabatic index, R is the molar gas constant, and T is the temperature. In such a case, if γ is known, then T can be used to identify the fluid temperature.

Speed of sound can also be useful in the case where one wishes to make qualitative observations concerning changes in the flow. For instance, if the flow density changes, this would be reflected by a change in the speed of sound. This method is most effective if the speed of sound is observable in both the upstream and downstream directions, as the average of the two speeds is robust against changes in the flow speed.

Further, if the speed of sound is known in both directions, as noted above it is possible to determine the flow speed. This is easier for gases than for liquids, as large changes in the flow speed tend to be needed to result in an easily observable change in the speed of sound for a liquid. If the speed of sound is only visible in one direction, a change in the speed of sound may also be linked to a change in flow speed.

2) Determination of Fluid Flow in Single Phase Flow Using Vortical Eddy Tracking Previous work has shown that, in constrained, well-developed, single-phase fluid flow, the streamline coincident motion of local convective fluid disturbances can introduce dynamic pressure variations which in turn impart dynamic strain on to the boundary walls. In the case of flow within a thin-walled pipe, this strain can be observed using a hoop strain-sensitive sensor mounted on the outer wall of the pipe. If, in the case of a straight pipe, an array of synchronized strain sensors is spaced with intervals less than the coherence distance for the flow, then the local convection of these vortical entities can be used to monitor the flow speed.

Figure 5:
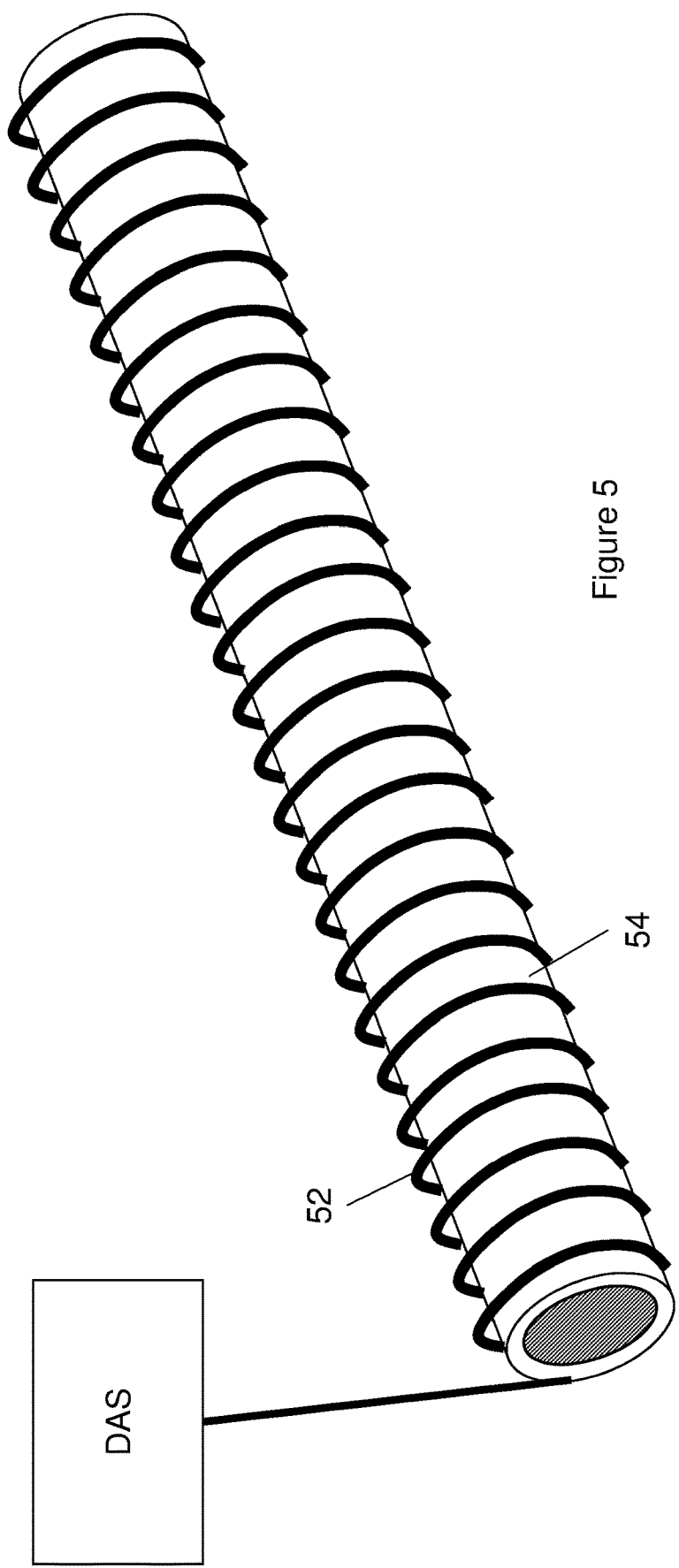
FIG. 5 is a diagram illustrating a pipe with a helical fiber wrapping.
Figure 6:
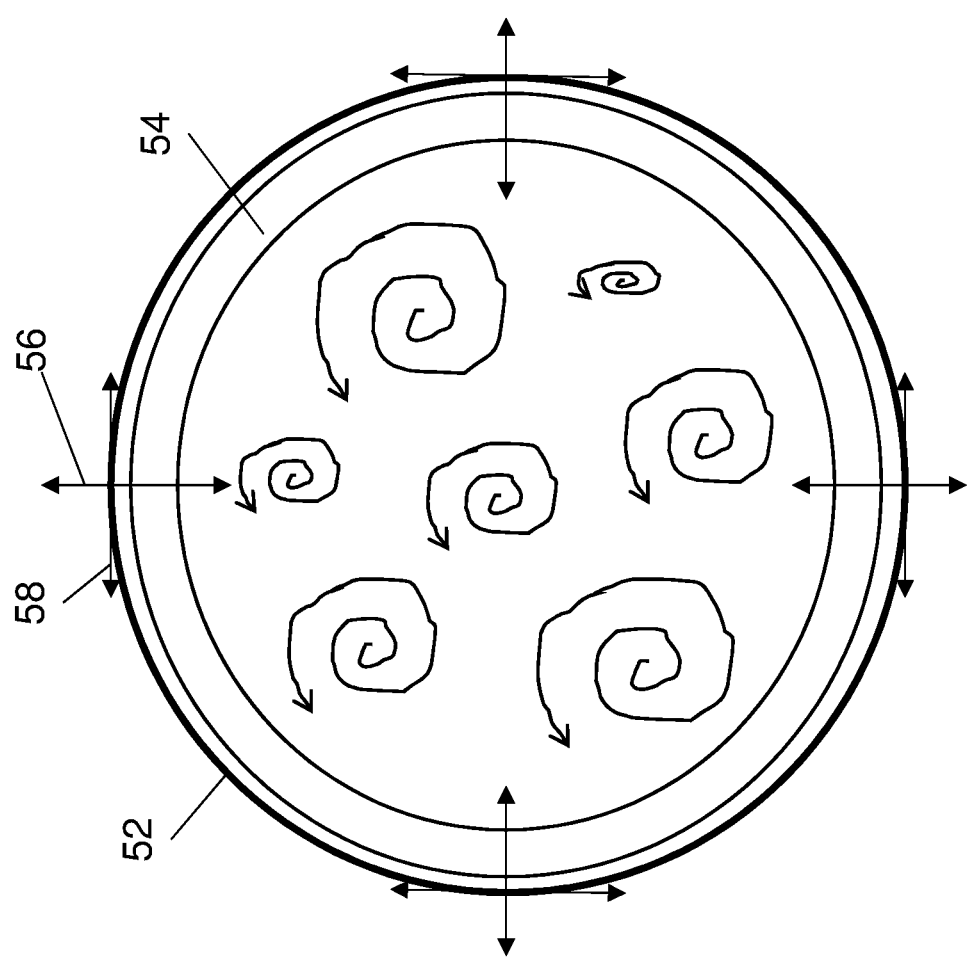
FIG. 6 is a diagram illustrating hoop strain induced by eddies in a pipe.
Figure 7:
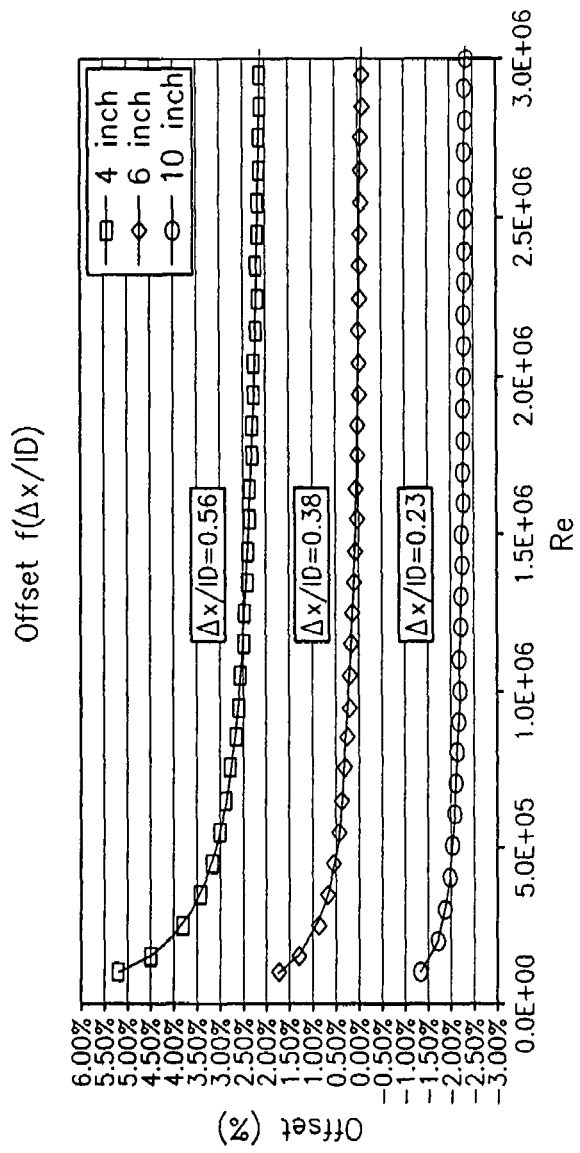
FIG. 7 is a graph of correction factor used to track eddies in a pipe.

A transduction technique by which vortical entities can be tracked is described in more detail here, with reference to FIGS. 5 to 7. As turbulent flow passes through a pipe, eddies of varying size are generated and dissipated continuously. The amount of time over which this generation and dissipation occurs is known as the eddy lifetime, and its spatial equivalent varies with the inverse square root of the Reynold's number (Mathieu and Scott, 2003). For the purpose of illustration, consider a single eddy passing through a fixed cross-section of a pipe. This single eddy, which will convect at nearly the speed of the fluid, will tend to create a localized disturbance in the cross-section of the pipe. This localized disturbance will induce a small perturbation on the pipe exterior for that fixed region. By using a synchronized array of radial strain sensors to observe the eddy as it moves through a successive series of cross-sections, it can be possible to 'track' this single eddy as it passes within the fluid. In practice, a multitude of eddies are present throughout the cross-section of a turbulent constrained flow, all of which can be used to monitor flow speed. It is in fact possible to use the DAS system to achieve such an array, as shown in FIGS. 5 and 6. By wrapping a continuous length of fiber 52 helically around the exterior of the pipe, as shown in FIG. 5, the DAS system can measure the dynamic radial strain (hoop strain) exerted along a section of a pipe and measure the convection speeds of eddies. FIG. 6 illustrates how the hoop strain (56) induced in the pipe (illustrated by the arrows perpendicular to the pipe) by the eddies translates, via the fact that the fiber is wrapped around the pipe, into longitudinal strain (58) along the fiber, which in turn can be detected by the DAS as modulated backscatter or reflections of light pulses travelling along the fiber.

For the purpose of this discussion, it should be noted that current-driven turbulent vortices create local pressure fluctuations which balance the local fluid acceleration, but which act like acoustic quadropoles and so do not propagate sound to any significant distance (Ffowcs Williams, 1969; Ffowcs Williams and Hawking, 1969). Therefore, while the dynamic pressure signal created by the vortices can be monitored locally, this 'pseudo-sound' does not result in plane wave acoustic propagation within pipes. It should however be noted that turbulent eddy tracking can be performed simultaneously with the sound-speed measurement capability described above.

With regards to determining the flow speed from the eddies, single phase flow monitoring can be performed by using eddy speed to identify flow speed. The speed obtained by tracking eddies is not the flow speed per se, but instead is related to the flow speed via a known correction factor. This correction has been documented previously by Rothman et al in U.S. Pat. No. 7,328,113, and FIG. 7 taken from this patent illustrates how the correction factor can be found in dependence on pipe diameter and measured eddy speed. By taking the product of the measured eddy speed with the correction factor for the pipe diameter and the measured speed, then the actual flow speed can then be found. Nonetheless, in applications where this correction factor is not known, the relative changes in eddy speed observed by the DAS system can be used directly without further manipulation.

B. Two-Phase Measurements

The above described flow measurement arrangements for single-phase flow can also be applied (adapted appropriately where necessary) for two phase flow measurements. When considering two-phase flow, it is then necessary to consider whether the two phases (e.g. liquid and gas, or two different liquids) are mixed together sufficiently such that the mixture can be considered homogenous (for example, a well-mixed oil-water emulsion would be such an example), or whether the two phases are sufficiently separated, for example as may be in the case of laminar flow, that the flow is inhomogenous, and properties of the two separate phases can be separately identified.

Homogenously Mixed Flows i) Eddy Tracking for Flow Speed

For homogenously mixed two-phase flows (and in fact for higher order, three-, four-, or higher phase flows up to slurry flows), eddies will be formed within the homogenously mixed fluid, such that the above described eddy tracking techniques used in a single phase flow can be applied, as described above. In such a case, because the multiple phases are mixed together, and the multiple phases then flow together as a matter of course, a single flow speed for the homogenous mixture will be obtained, by tracking eddys formed in the homogenous mixture. In this respect, the homogenous mixture acts like a single phase fluid with regards to eddy formation, and hence the same techniques for single phase flow eddy tracking for flow determination are used.

ii) Speed of Sound Tracking and Composition Determination

For speed of sound tracking in homogenous flows, how the speed of sound changes with composition depends on the nature of the two phases for well mixed flows. In particular, the primary distinction lies in whether the two phases are both liquids, or whether one phase is liquid and the other a gas.

a. Liquid-Liquid Homogenous Flows

Figure 8:
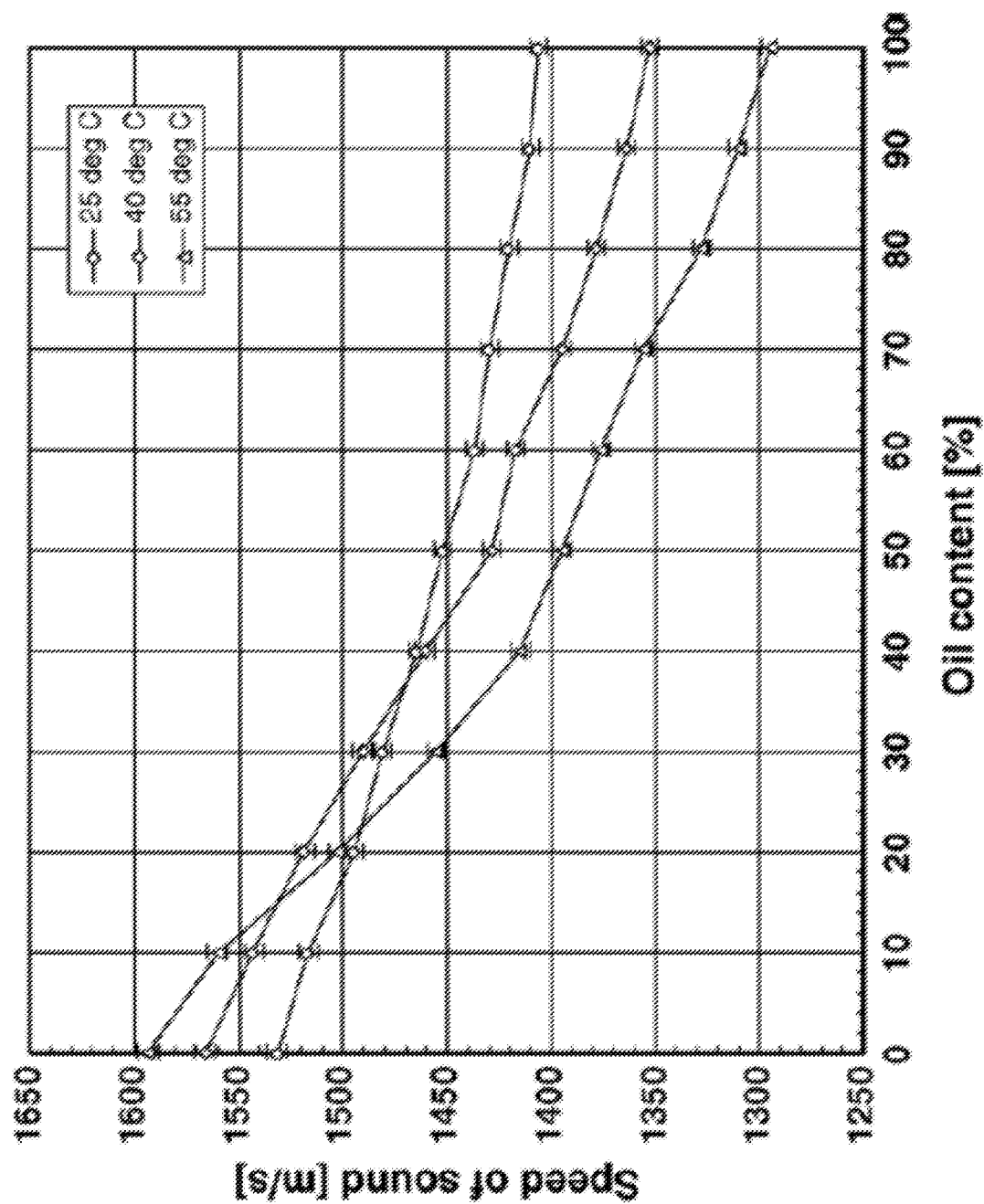
FIGS. 8 to 12 are various plots of speed of sound against composition, that may be used as look-up tables in embodiments of the invention to determine composition of multi-phase flows.

For well mixed flows comprising two liquids, for example oil and water, the speed of sound tracking technique described above for single phase flows can be used to determine the flow speed. The reason for this is that because the flow is well mixed, there is a single bulk flow speed that results, as well as a single overall speed of sound for the mixture. Moreover, however, by also measuring the absolute values of the speed of sound, which is readily achievable with an optical fiber DAS as previously described, then it is also possible to determine the oil-water percentage mix. For example, FIG. 8 is a graph taken from Meng, White, and Jaworski *Composition measurements of crude oil and process water emulsions using thick-film ultrasonic transducers* Journal Chem Eng and Processing, vol. 45, issue 5, pp. 383-391, that illustrates how the speed of sound changes in an oil-water emulsion dependent on the percentage oil content. By measuring the speed of sound using the DAS, the oil content within the two phase oil-water homogenous mixture can then be found, via such data.

For a liquid-liquid two phase homogenous mixture, therefore, flow speed and composition can be found using the same speed of sound determination techniques describe above for single phase flow to determine the flow speed, and then applying the measured speed of sound to a priori data relating speed of sound to composition. Specifically for oil-water mixtures, the oil content can be found over multiple temperature ranges using a priori data defining the speed of sound-oil content relationship such as that shown in FIG. 8.

b. Liquid with Gas (Bubbly Flow)

Figure 9:
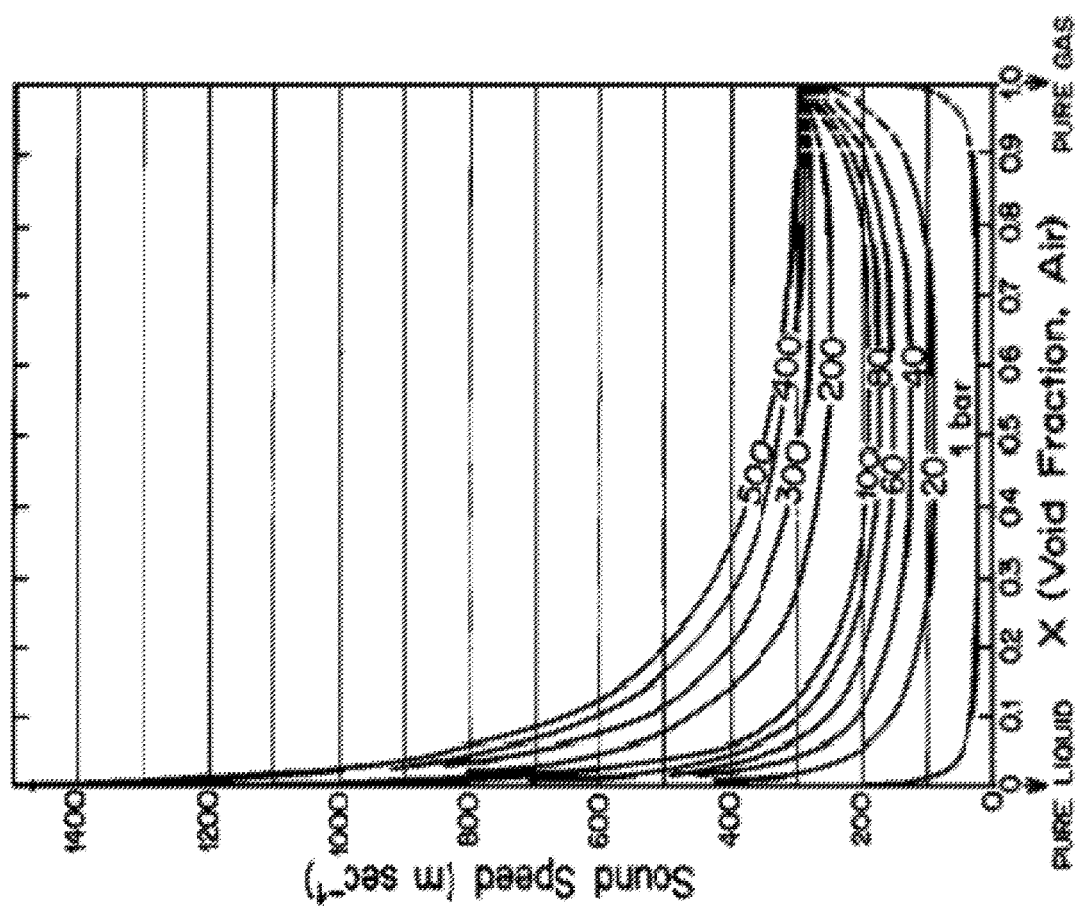

For a two-phase liquid and gas well-mixed flow, flow speed can again be found using the speed of sound measurement technique described above for single phase flows. To then measure the composition, the speed of sound can again be applied to a priori determined speed-of-sound vs compositional percentage data, such as that shown in FIG. 9, taken from Kieffer, S. W. 1977. Sound speed in liquid-gas mixtures: Water-air and water-steam. *Journal of Geophysical Research*, 82 (20), 2895-2904. It can be seen from FIG. 9 that, as small amounts of gas are introduced into the system, the speed of sound drops significantly from the bubble free case. As a result, speed of sound-based gas holdup monitoring is most sensitive at low void fractions.

To understand bubbly flows within pipes, it is first useful to consider the physics of bubbly liquids in absence of pipe effects. The speed of sound for bubbly flows exhibits a very high dependence on the gas content. This can be understood through a straightforward consideration of the dependence of wave speed on bulk modulus $B=-V(dp/dV)$ where $c=(B/\rho)^{1/2}$. As has been previously observed (Leighton, *The Acoustic Bubble*, Academic Press, 1994), "When a liquid contains gas bubbles, its bulk modulus decreases, since for any given change in pressure, the change in volume is greater than in the bubble-free liquid: In simple terms, the bubbles expand significantly in response to a pressure reduction, and are contracted more than the surrounding liquid during compression . . . ". In the Kieffer paper referenced above, it is assumed that bubbly flow consists of gas entities which are small and therefore exhibit resonant frequencies at least an order of magnitude above the acoustic frequencies of interest. Since the timescale of oscillation is "slow" in terms of the relevant bubble dynamics, some heat transfer takes place at the interface between the liquid and the walls of individual bubbles. Hence, as a result the high degree of thermal conductivity for the dominant liquid phase flow matrix component, the acoustic propagation can be treated to a first approximation as isothermal. In the figure taken from Kieffer in FIG. 8, the speed of sound for well-mixed water-air mixes has been shown.

Regarding the shape of the curves in FIG. 8, it will be seen that the greatest sensitivity in terms of the largest change per unit speed of sound with incremental void fraction occurs at low void fractions and then again at higher void fractions. From void fractions of about 0.3 to 0.7 the Kieffer data shows that the measured speed of sound is essentially unchanged or little changed, particularly at low pressures, and hence in this region it may be difficult to obtain an accurate composition based on speed of sound data. However, for higher pressures, as shown, there is a constant change in speed of sound with changes in void fraction, and hence at such higher pressures composition can be obtained from speed of sound measurements across the whole compositional range.

c. Wet Gas Flow (Gas with Liquid Droplets)

Figure 10:
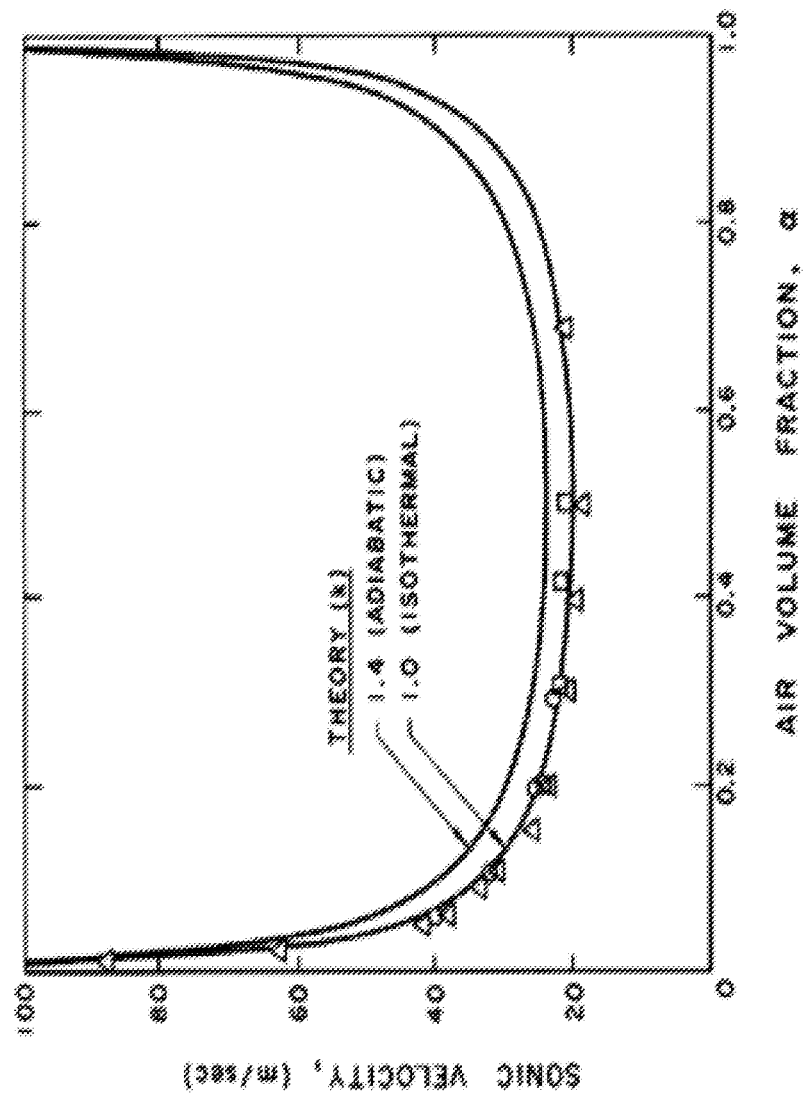

This two-phase flow corresponds to the opposite end of the gas volume fraction i.e. where there is predominantly gas, with liquid droplets entrained therein. Eddy tracking can be used as previously described for flow speed determination, but in addition speed of sound tracking can be used for both flow speed and composition determination. FIG. 10 shows an alternative set of data mapping speed of sound to gas void fraction, which is more accurate for high gas void fractions in this case. As will be seen, the speed of sound increases rapidly at gas void fractions above approximately 0.7, and hence there is a high degree of sensitivity in terms of changes in speed of sound to gas void fraction at these levels. By measuring the speed of sound in this regime, therefore, an accurate determination of the gas void fraction can be found. In addition, the speed of sound can also be used to determine the flow speed, in the same manner as described above with respect to single phase flow.

Inhomogenous Flows i) Eddy Tracking for Flow Speed

For inhomogenous flows where it is possible to discern the two individual phases flowing separately without significant mixing, for two liquid phases a single flow speed is obtained, because eddys in the flow in the specific case of a liquid-liquid boundary appear able to cross that boundary i.e. there can be a cross-boundary eddy which can be tracked to give a single measurement of flow speed for both liquids forming the liquid-liquid two phase flow.

For other combinations, however, i.e. for liquid with gas (i.e. predominantly liquid with less gas), or gas with liquid (i.e. predominantly gas with less liquid) it may be possible for eddies to form separately in each phase, and to be detected separately by the DAS system. In this case, eddy tracking can be used to determine the flow speeds directly by direct measurement of the eddy movement separately in each phase i.e. liquid or gas. Therefore, the DAS data would return two eddy speeds, each of which can be separately assigned to each flow phase.

ii) Speed of Sound Tracking and Composition Determination

For speed of sound tracking in inhomogenous flows, how the speed of sound changes with composition depends on the nature of the two phases. In particular, as with homogenous flows, the primary distinction lies in whether the two phases are both liquids, or whether one phase is liquid and the other a gas.

a. Liquid-Liquid Inhomogenous Flows

Figure 11:
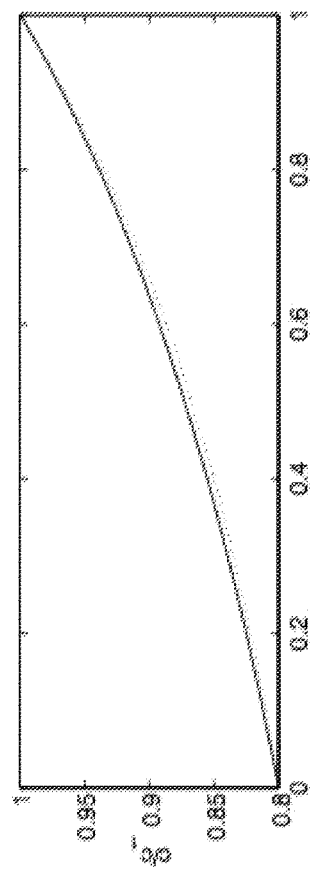

FIG. 11, taken from Van Dijk, P., *Acoustics of Two Phase Pipe Flows*, PhD Thesis, University of Twente, 2005, shows the speed of sound for a water-oil mixture for a dispersed (dotted line) and a stratified (solid line) flow, in terms of their values in pure water. The speed of sound axis has been normalised to illustrate the speed of sound as a coefficient of the actual physical value. This graph therefore shows that the measured speed of sound along the pipe can be used to directly calculate the composition, even for stratified flows.

b. Liquid with Gas (Bubbly Flow)

Dispersion of fundamental mode and cut-off frequencies from modal analysis can be used to extract GVF (gas void fraction) from an analytic function (in the case of symmetric geometries) or a numerical model (in the case of non-symmetrical geometries).

When averaging over extended lengths of time or space, the system could return more than one sound speed, indicating the presence of time/space-variants within the flow (eg water+air bubble phase at 100 m/s and air phase at 300 m/s).

Figure 15:
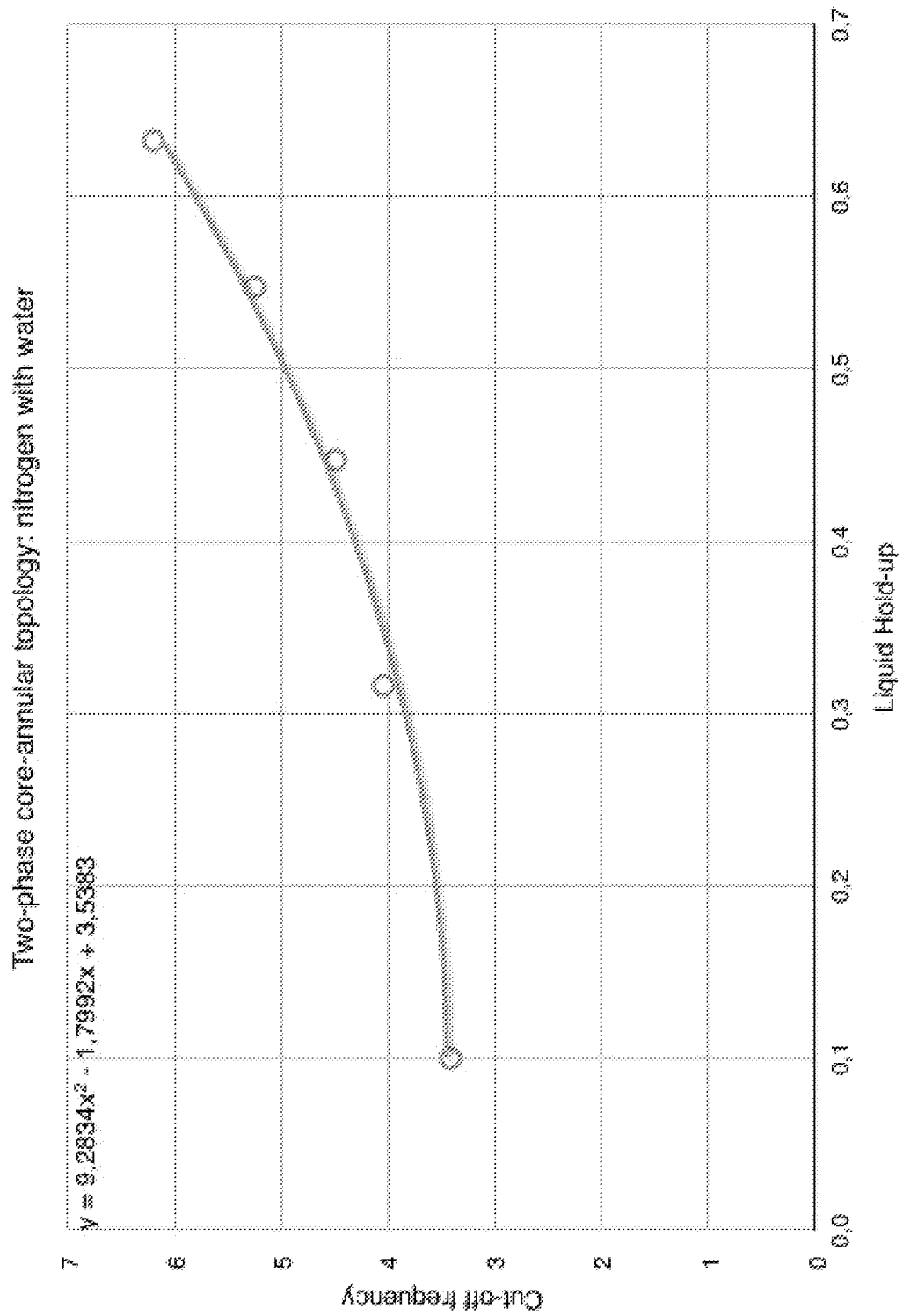
FIG. 15 is a diagram illustrating cut-off frequency to liquid hold up fraction.

In more detail, FIG. 15 shows a plot of dispersion mode cut-off frequency as obtained from k-ω plots of the DAS data versus gas void fraction. Using a simulation for axisymmetric modes in which we have simulated core-annular flow in an elastic pipe (Schedule 40 Steel pipe with nitrogen and water at 100 psi, 20 degrees Celsius), varying the liquid holdup (i.e. the gas void fraction) results in a quadratic relation between hold-up and cut-off frequency of the 01-mode change in the cutoff frequency as shown above. A similar result has been obtained in experiments by Silixa at NEL.

Hence, with the above, analysis of the k-ω data to identify the dispersion curve cut-off frequencies can then be used with a look-up table corresponding to FIG. 15 to determine the gas void fraction in a two-phase liquid gas inhomogenous flow, and thereby determine the composition.

With respect to determining the flow, we have found that the wavenumber offset in the dispersion function can be used to meter flow. That is, the y-intercept of the group speed for some higher order modes has been found to be equivalent to the flow speed.

In more detail, for small wave numbers k, the dispersion curve followed by some higher order modes seems to follow the shape of a parabola. A best fit curve can be found by positioning 3 points on the dispersion curve and taking their coordinates. Then, solve the three equations of the form $f(k)=ak^2+bk+c$ to find a, b, and c. We have found that b i.e. the first order coefficient very closely matches the expected flow speed FIG. 16 is a k-ω plot with an example showing this technique.

Figure 16:
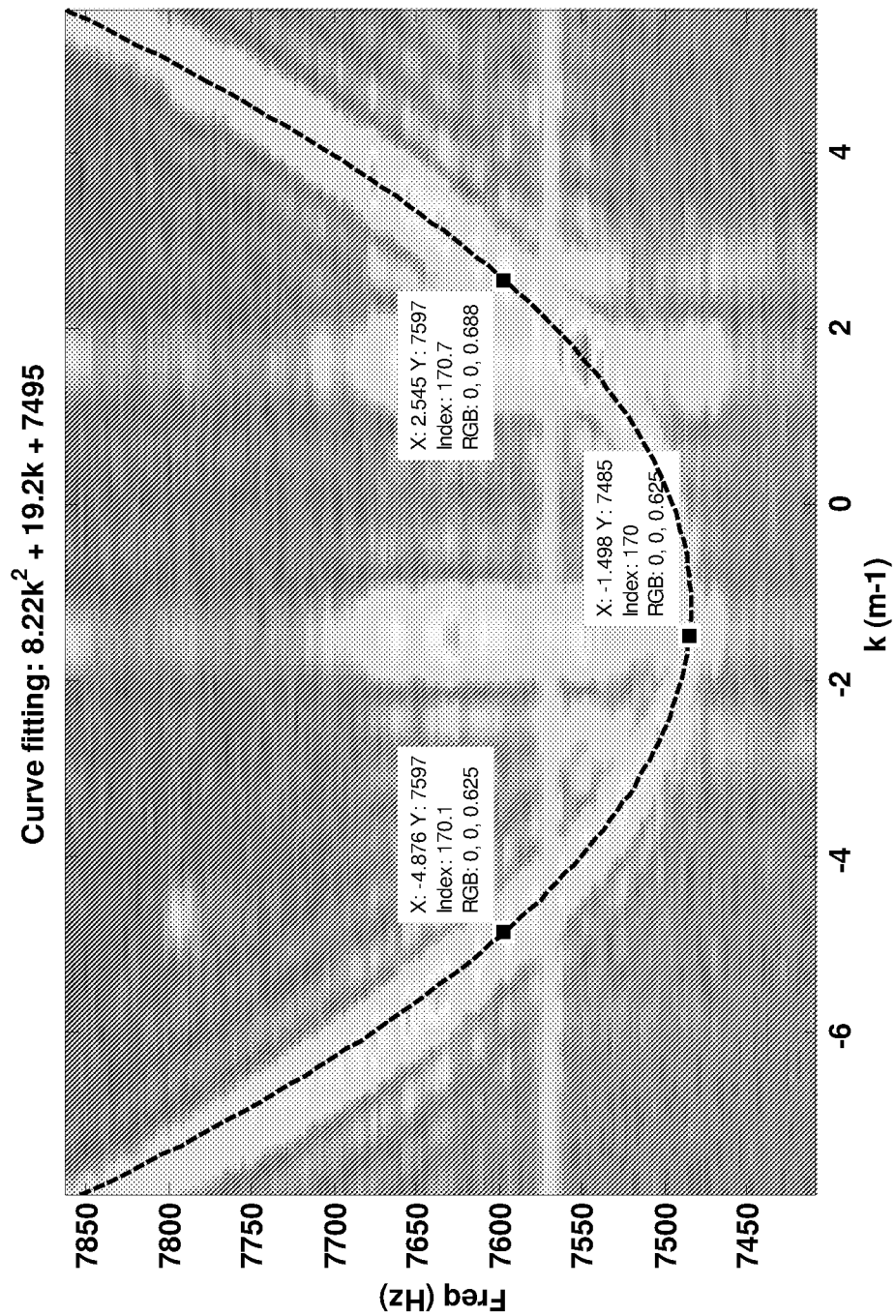
FIG. 16 is a k-ω plot illustrating how flow speed can be found therefrom.
Figure 17:
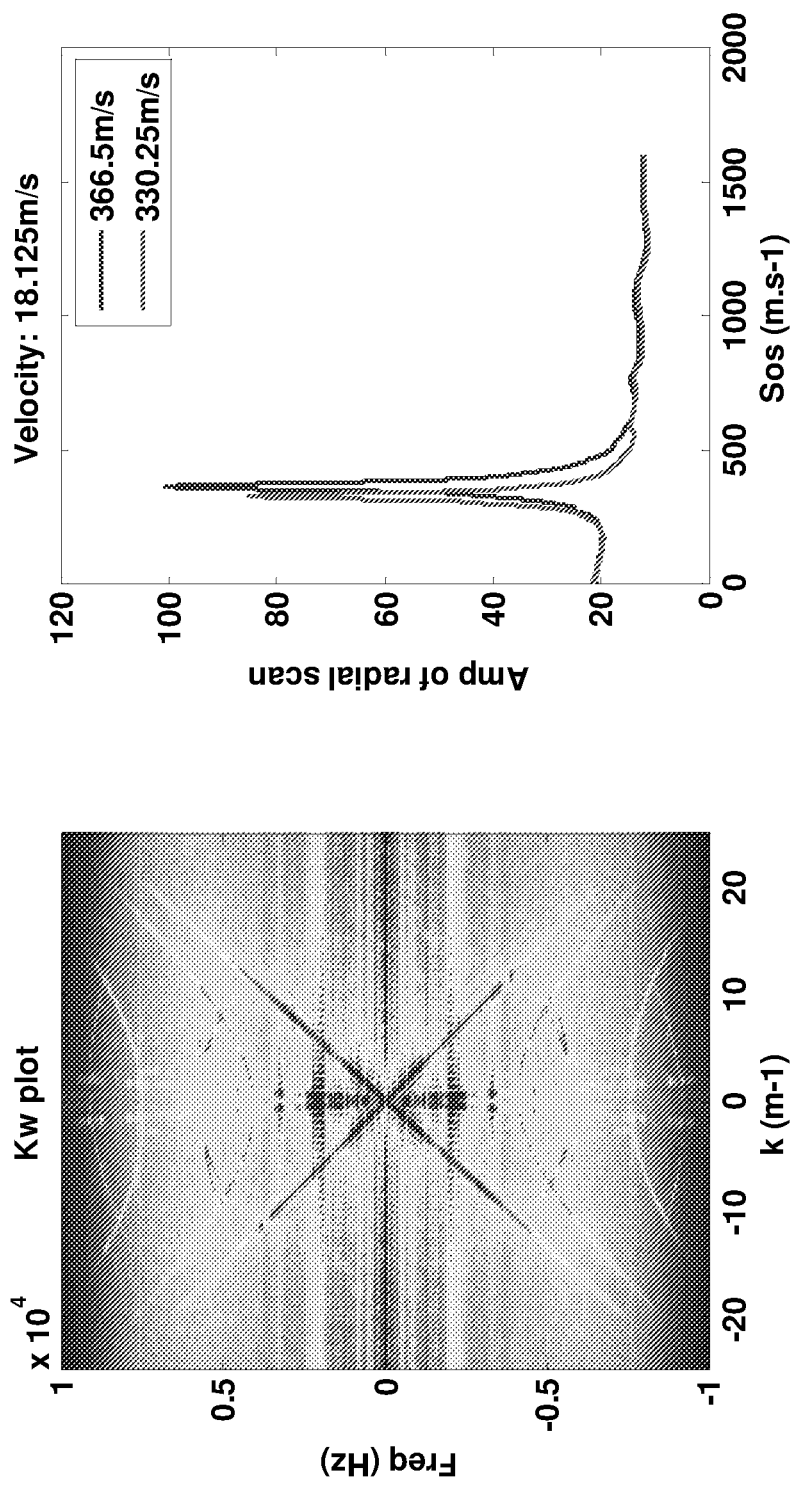
FIG. 17 is a k-ω plot used to illustrate cut-off frequencies and frequency aliasing in dispersion curves.

It can be seen from the k-ω plot in FIG. 16 that the coefficient "b" is 19.2. This is close to the flow speed identified using the standard Doppler approach for the Stoneley mode in the plot shown in FIG. 17 (the method has been confirmed further in other data). Thus, in those cases where sound is only propagating in one direction, even though the Doppler approach will be ineffective, the flow speed can be determined via acoustics using this modal curve fitting approach, using parametric curve fitting to fit a substantially parabolic curve to the dispersion curve.

c. Wet Gas Flow (Gas with Liquid Droplets)

Dispersion of fundamental mode and cut-off frequencies from modal analysis can be used to extract GVF (gas void fraction) using a numerical model, as described above with respect to the bubbly liquid flow. In addition, flow speed can also be found using the same parametric curve fitting technique also described above.

C. Three-Phase Measurements

The above described flow measurement arrangements for single-phase flow can also be applied, adapted appropriately where necessary, for three phase flow measurements, for example, oil-water-gas flows. As with two phase flows, when considering three-phase flow, it is then necessary to consider whether the three phases (e.g. typically two different liquids and some gas) are mixed together sufficiently such that the mixture can be considered homogenous (for example, a bubbly well-mixed oil-water emulsion would be such an example), or whether the three phases are sufficiently separated, for example as may be in the case of laminar flow, that the flow is inhomogenous, and properties of the three separate phases can be separately identified.

Homogenously Mixed Flows i) Eddy Tracking for Flow Speed

As mentioned previously, for homogenously mixed three-phase (and higher-order) flows, eddies will be formed within the homogenously mixed fluid, such that the above described eddy tracking techniques as are used in a single phase flow can be applied, as described above. In such a case, because the multiple phases are mixed together, and the multiple phases then flow together as a matter of course, a single flow speed for the homogenous mixture will be obtained, by tracking eddys formed in the homogenous mixture. In this respect, the homogenous mixture acts like a single phase fluid with regards to eddy formation, and hence the same techniques for single phase flow eddy tracking for flow determination are used.

ii) Speed of Sound Tracking and Composition Determination

For speed of sound tracking in homogenous three phase flows, it is expected that a combination of the techniques described above for liquid-liquid homogenous flows, in combination with the techniques described above for the liquid-gas homogenous flows can be adopted. That is, by treating the combined bulk gas and/or combined bulk liquid phase liquids as components within a mixture, acoustic functions of the type applied above can be applied to enable acoustic composition determination. Thus, for example, in a bubbly, well-mixed liquid-liquid-gas three phase flow, the composition of the well-mixed liquid-liquid phases can be found in the same manner as described above for liquid-liquid two-phase flows, provided a section of pipe from which the bubbles can be excluded is provided at which to take the measurement. The found speed of sound for the non-bubbly section can then be used as the baseline of the two liquid phases when applied to the bubbly section, and the gas void fraction relating to the bubbles then found using the techniques described above for two phase liquid with gas flows, but with the speed of sound for the two-liquid phases used as the maximum speed of sound at 0% GVF, with the remainder of the curves scaled appropriately.

Alternatively, the determination of gas presence in a three phase flow can be undertaken through dispersion curve pattern recognition.

Inhomogenous Flows i) Eddy Tracking for Flow Speed

For inhomogenous flows where it is possible to discern the three individual phases flowing separately without significant mixing, for multiple liquid phases a single flow speed may be obtained for the plural side-by-side liquid phases, because eddys in the flow in the specific case of a liquid-liquid boundary appear able to cross that boundary i.e. there can be a cross-boundary eddy which can be tracked to give a single measurement of flow speed. Where a third gas phase is also present, a separate eddy may be discernible within the gas phase flow.

More generally, therefore, for other three phase combinations, however, i.e. for liquid with gas (i.e. predominantly liquid with less gas), or gas with liquid (i.e. predominantly gas with less liquid) it may be possible for eddies to form separately in each phase, and to be detected separately by the DAS system. In this case, eddy tracking can be used to determine the flow speed directly by direct measurement of the eddy movement separately in each phase i.e. liquid or gas. Therefore, the DAS data would return two or three eddys, whose speed can then be separately tracked for each phase.

ii) Speed of Sound Tracking and Composition Determination

For speed of sound tracking in inhomogenous three-phase flows, it is possible to obtain more than one sound speed measurement from the DAS, indicating the presence of different phases within the flow.

D. Slurry Flows

The above described flow measurement arrangements for single-phase flow can also be applied, adapted appropriately where necessary, for slurry flow measurements, for example where fine solids are suspended in a liquid carrier. In this respect, a slurry flow often resembles a homogenously mixed flow. In some cases, a slurry flow may resemble a stratified flow wherein two eddy speeds can be revealed in connection with the speeds for each of a liquid-dominated and solid-dominated layer.

i) Eddy Tracking for Flow Speed

For slurry flows, eddies will be formed within the slurry fluid, such that the above described eddy tracking techniques as are used in a single phase flow can be applied, as described above. In this respect, the slurry mixture acts like a single phase fluid with regards to eddy formation, and hence the same techniques for single phase flow eddy tracking for flow determination are used as described above.

ii) Speed of Sound Tracking and Composition Determination

Figure 12:
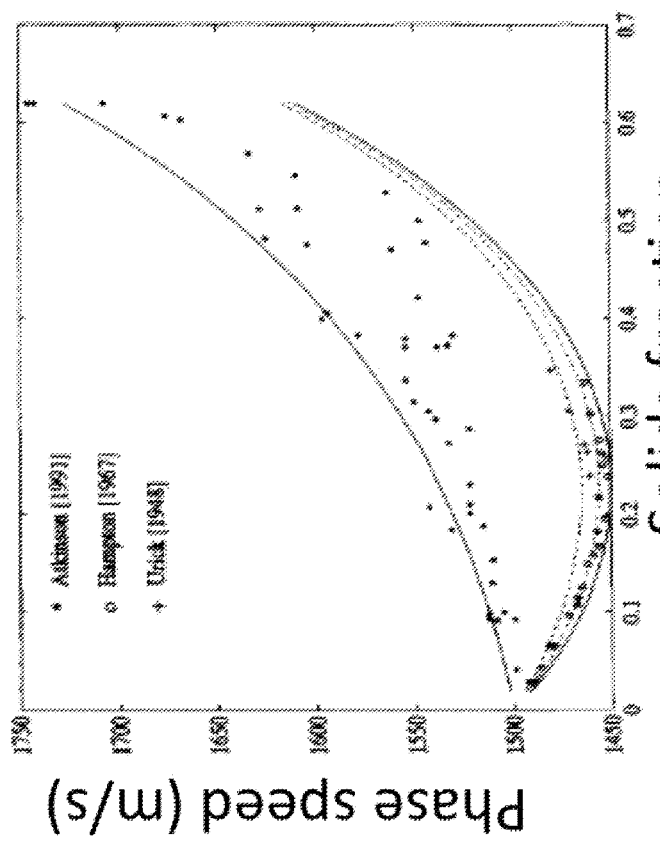

Previous work shows that speed of sound changes in a slurry are dependent on the solids fraction (see e.g. FIG. 12, that illustrates variations of sound speed in a suspension with particle concentration: o $ka=6.6\times10^{-5}$ (Hampton, 1967), + $ka=3.4\times10^{-4}$ (Urick, 1948). The data and figure are taken from (Atkinson, 1991)). These experimentally determined functions can be used in conjunction with speed of sound tracking as described previously to determine the solid fraction of a slurry. In particular, the Doppler based speed of sound determination technique described previously with respect to single phase flow can be used to determine the flow speed, and then the actually measured speed of sound can be used, via a look-up table based on the data of FIG. 12, to determine the composition in terms of the solids fraction of the slurry.

E. Other Issues

Slugs

The Silixa® DAS is able to identify the presence of slugs, monitor the periodicity of their occurrence, and can see the speed at which they are travelling. In an extended slug, the flow composition methodologies described above could be applied. kω processing can be used to identify slug onset.

In this respect, a slug within a single phase flow (for example) can be thought of as an inhomogeneity within the flow. Above we described how flow speed can be determined by tracking vortical eddies within an otherwise homogenous single phase flow. However, similar or the same techniques may also be applied to perform flow tracking by tracking slugs within the flow. In this respect, by "slug" we mean a non-vortical inhomogeneity within the flow, for example a section of flow material that is moving faster or slower than the mean flow speed, or that has some other different local property than the mean properties of the flow. For example, the slug may be a section of flow that is at a slightly different temperature to the mean temperature of the surrounding bulk flow, or may be a slightly different density, or may be moving at a slightly different speed in the flow. The main point, however, is that like vortical eddies, properties of the slugs can be detected by the optical fiber sensor, and those properties tracked along the pipe as the slug moves along the pipe with the flow. As such, monitoring the movement of the slug along the pipe will allow for properties of the flow such as the flow speed to be determined. For example, slow moving slugs can be detected in the acoustic domain by a low frequency propagating disturbance. The time rate at which these disturbances are generated is indicative of the slug passage rate.

Note that slugs can be therefore be used for flow tracking within both single phase flows, and also within multi-phase flows, for example an unmixed well stratified inhomogenous multi-phase flow (e.g. a stratified oil and water flow) may contain respective slugs within each material, such that respective slugs in each material can be separately tracked to allow for multi-phase flow tracking. Slugs may also be used to track single phase flows as well.

Novel Installations

In some cases, horizontal slug or inhomogeneous flows may create issues which can be resolved by measuring the same flow in a vertical orientation. Therefore, in some cases, it may be advisable to instrument a horizontal pipe, a vertical pipe, or even a curved pipe.

It can be of value to install two flow meters in series onto two differently oriented pipes (eg a horizontal followed by a vertical section). The fluid passing through both pipe sections will not change, however its flow regime is likely to; therefore one may utilise the combined flow measurement information extracted from both horizontal and vertical pipes to derive more accurate composition and flow rates.

Pre-conditioning of the flow through blind T junctions for example can help homogenise the flow for the vertical section.

Combinations with Other Sensors

A DAS may be used to derive flow information in ways not yet described above. For instance, if the pressure drop across a flow metering section (measured via pitot tube) is combined with DAS velocity data, the Bernoulli relation can be used to derive the viscosity term for the flow.

A Karman street-based vortex counting meter could be enabled with a DAS. In this arrangement, the acoustic output from DAS would be examined for the acoustic data indicating the shedding rate imparted by the interaction between a flow and a specially-designed obstruction. A look-up table would then be used to determine the flow rate on the basis of the vortex shedding rate.

A DAS-enabled flow cable could be used in parallel with a wrapped sound speed-sensing section to create an easy-to-install industrial flow monitoring tool. In this arrangement, a flow cable would be used to measure the eddy speed. This output would be supplemented by the acoustic signal as measured by an optical cable wrapped around the entire pipe. It could be that a lower wrap density would be used for the acoustic sensing cable than that found on the vortex measurement cable. By reference to a "flow cable" anywhere herein we mean an arrangement of typically helically wrapped optical fiber around a core, and then usually covered in a protective sheath to help hold the fiber in place, the resulting structure then being a "flow cable" as referred to herein. Example flow cables are described in our earlier International patent application no. WO2015/056012, where they are referred to as helically wrapped optical fiber cables.

A solenoid type sound source could be used as an interrogator for the fluid composition. For liquid-liquid flows the sound source will illuminate the flow and enhance the generation of one directional Stoneley waves. A vibration densitometer could be enabled by using a DAS to measure pipe density.

F. Downhole Sensing

The above described techniques may be used for above surface and downhole sensing. However, for downhole sensing additional processing techniques can be employed, as described below.

Perforation Zone Noise Sensing

Noise generated by perforations can be processed in a number of ways to reveal information concerning production and/or injection. These methods are outlined below.

i) Noise Power

The flow rate of single phase flow can be modelled using a jet-noise model wherein the noise level varies with flow rate according to a power law relation. In the classic jet noise model, flow noise is proportional to the 8th power of flow velocity. This model neglects compressibility and cavitation.

ii) Frequency Content

Resonators can be activated by flow activity. Consider for instance a simple Helmholtz resonator, such as that encountered when blowing air over the top of an empty Coke bottle. Such noise can be used to characterise perforations and reservoirs. A simple approach involves lumped elements as described in the Beranek monograph entitled Acoustics (Acoustical Society of America, reprinted 1986). By treating a given perforation as a resonator and identifying the characteristics of the relevant resonant peak (including centre frequency and peak width), it is possible to identify the essential components of the acoustic circuit for that particular system. The components include the acoustic mass, resistivity, and compliance which in one simple model correspond respectively to the hole size, flow resistance, and cavity volume.

iii) Sound Quality

Practitioners of psychoacoustics have long-acknowledged that basic time-frequency analysis is insufficient for understanding the character of a signal. In the presence of multiphase flow, Silixa has pioneered the use of sound quality metrics and higher order statistics for the purpose of identifying the presence of bubbles, sand, single-phase and multiphase flow. In this paradigm, signals can be analysed by complex algorithms and assigned a score. The score can be compared to pre-existing datasets for the purpose of understanding the flow content.

In more detail, "sound quality" refers to the nature of the sound in a way that is not easily described using simple amplitude and frequency spectrum interpretations. Consider for instance two sounds, one of which consists of a single, high power tone at 1 kHz, and another of which consists of that same tone produced intermittently in a manner which could be described as "beeping". Both of these signals will have the same frequency spectrum, but each signal conveys a unique type of information to the listener. Hence when analysing sounds using only time averaged frequency spectra, important information concerning the nature of the acoustic signal can be obscured. The analysis of time-variant statistics concerning an acoustic signal is wide-spread in automotive and appliance design, but has not yet been developed within the field of in-well production monitoring. Sound quality metrics and higher order statistical methods can be used to reveal important features, such as the presence of multiphase flow or the inflow of solids in a production environment.

By way of example consider for instance the detection of water entry in a gas producing well. In the absence of water, the acoustic signal resulting from gas production through a perforation into production tubing is highly broadband. As water begins to be produced through a zone which was previously gas-only, the acoustic frequency spectrum may vary only slightly, but other time series-related statistical quantities may indicate vast changes in the signal quality. In comparison to the time-averaged frequency spectrum, signal statistics such as (1) kurtosis and (2) roughness (fluctuation strength) become highly sensitive to the type of acoustic signal variations which result from undesirable multiphase production. In practice, an approach based on a quantity such as kurtosis can be applied to acoustic data from all depths within a well to determine the depth at which the noise production mechanism shifts from being purely single-phase jet noise to being multiphase interaction-based.

In terms of the application of such a measure, consider a well that is being monitored by an optical fiber DAS, at least along the production zone. The optical fiber DAS is capable of producing a spatially high resolution acoustic output, such that a separate acoustic signal can be resolved typically every 1 m to 5 m. With the use of specialist cables, for example with helically wrapped optical fibers therein, the acoustic spatial resolution can be increased to be on the cm scale, for example, as low as a few cm. The important point for present purposes, however, is that individual broad spectrum acoustic signals can be resolved at high spatial resolution along the production zone.

As noted above, each individual acoustic signal can be signal processed, for example using Fourier techniques, to obtain time variant frequency spectra, which can be time averaged to produce an average frequency spectrum for a particular measurement point for each spatial length that can be resolved. However, as noted above, simply reviewing the time averaged frequency spectra per se may not be sufficient to allow any differences therein relating to changes in production within the production zone to be determined, and therefore the frequency spectra themselves should be subjected to further analysis, and in particular in some embodiments by looking at the degree of kurtosis of the frequency spectra. In this respect, the kurtosis of a frequency spectrum is a measure of how peaked or flat the frequency spectrum is, in that a spectrum which is concentrated around a single frequency, with the amplitude dropping off quickly at frequencies either side would have positive excess kurtosis, or be said to be leptokurtic. Conversely, a spectrum that looks more like a normal distribution of frequencies around a center frequency is said to be mesokurtic, having zero excess kurtosis, whilst a spectrum that is broader and flatter than a normal distribution, is said to be platykurtic, and has negative excess kurtosis. In this respective, "excess kurtosis" is defined as the value of kurtosis found from the distribution being measured (i,e, in this case the frequency spectra), minus three. Further details on how to measure Kurtosis can be found at https://en.wikipedia.org/wiki/Kurtosis.

With the above in mind, therefore, in further embodiments the optical fiber DAS output from along the zone of interest in the well, typically the perforation zone, is processed to determine frequency spectra for the available measurement zones along the well (determined by the spatial resolution of the DAS), and then the determined frequency spectra are themselves subject to further processing to determine a kurtosis value of each spectra. The frequency spectra and associated kurtosis values are repeatedly updated along the perforation zone, and at those points along the well where predominantly single phase flow turns into multi-phase flow, for example where water enters a gas well, we expect to see a slight change in the frequency spectra, but which should be represented as a larger change in the measured Kurtosis. Hence, by looking along the monitored perforation zone and calculating Kurtosis values for monitored segments therealong (at the spatial resolution of the DAS), changes in the calculated Kurtosis values can indicate a change in the phase of the flow at that same point i.e. a change from single phase to multi-phase flow, where, for example, water or oil is entering a gas well. Monitoring Kurtosis values derived from frequency spectra along the length of the production zone can therefore indicate changes in multiphase flow along the well.

Of course, monitoring multi-phase flow using kurtosis values derived from frequency spectra is not limited in use to downhole wells, but can be applied more generally to any fluid carrying pipe, whether downhole or otherwise. In addition, the above embodiment is not limited to only using kurtosis values as representative of the frequency distribution. Other parameters representative of the detected acoustic signals, such as the skewness of the frequency distribution, or the roughness (fluctuation strength) of the actual signal itself may be used as alternatives to or in addition to looking at the kurtosis at points along the pipe. In this respect, the "skewness" of the frequency distribution is a measure of the assymmetry of the distribution about its mean (see e.g. https://en.wikipedia.org/wiki/Skewness for a further discussion of skewness). Changes in the skewness of the frequency distribution of the acoustics of a monitored flow along a pipe may indicate changes in the flow, for example changes due to the introduction of a second phase into the flow (e.g. water entering an oil flow in a well), by way of example.

On the other hand, the roughness (fluctuation strength) of the monitored acoustic signal does not relate to a frequency distribution of the signal, but rather to properties of the actual waveform itself. The roughness of a signal quantifies the subjective perception of rapid amplitude modulation of the monitored signal, and is measured in aspens, whereas the fluctuation strength quantifies the subjective perception of a slower amplitude modulation (sub 20 Hz), and is measured in vacils. Further details as to how to find both the roughness or fluctuation strength of a signal were available at the priority date at the following URL: http://www.salfor-d.ac.uk/computing-science-engineering/research/acoustics/psychoacoustics/sound-quality-making-products-sound-better/sound-quality-testing/roughness-fluctuation-strength suffice to note here that the Roughness R of a signal is found using:

$$R = cal \cdot \int_0^{24Bark} f_{mod} \cdot \Delta L \cdot dz$$

where cal is a calibration factor, fmod is the frequency of modulation and $\Delta L$ is the perceived masking depth, whereas the fluctuation strength F of a signal is found using:

$$F = \frac{0.008 \int_0^{24Bark} \Delta L \cdot dz}{\left(\frac{f_{mod}}{4 \text{ Hz}}\right) + \left(\frac{4 \text{ Hz}}{f_{mod}}\right)}$$

In terms of using Roughness and Fluctuation Strength for phase monitoring of flow along a pipe, again the acoustic signals from along the pipe as measured by the optical fiber DAS can be processed in accordance with the above to determine both Roughness and Fluctuation values for multiple positions along the pipe. If the Roughness and/or fluctuation values change along the pipe, than changes in the flow within the pipe may also be inferred.

Flow in Between Perforation Zone Sensing

A flow cable or wrapped flow meter may be installed in between perforation zones in order to track vortical eddies.

Installation Geometry

It should be noted that the installation method used for the cable will have an impact on the signal received. For instance, for a cable suspended within the production volume near a perforation, near-field non-acoustic fluid-structure interaction can be used to identify flow activity.

G. Detecting Inhomogenous Two-Phase Flow with Respective Cabling

Figure 18:
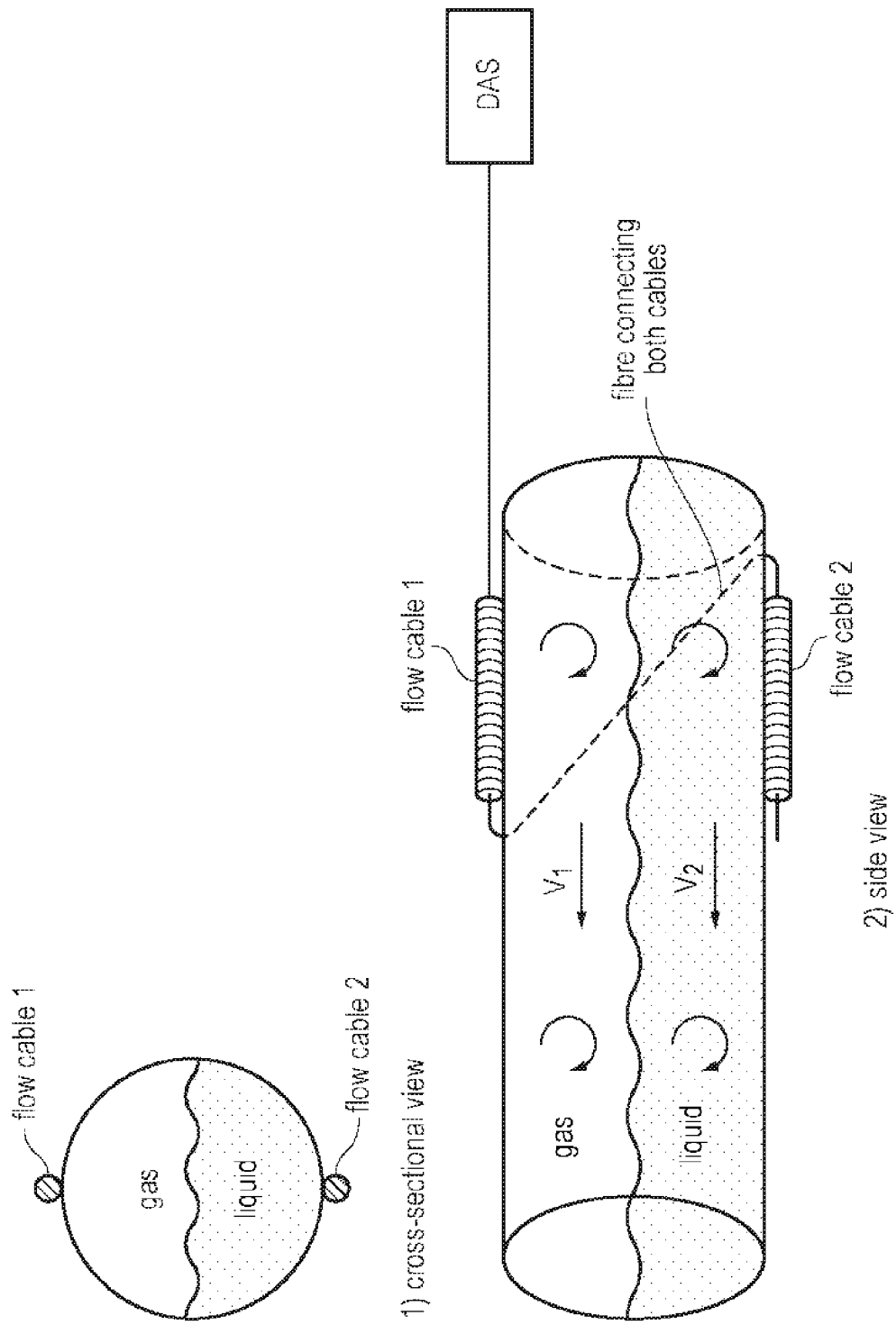
FIG. 18 is a diagram illustrating the setup of a further embodiment of the invention.

FIG. 18 describes a further embodiment that may be used for inhomogenous two-phase flows, where a pipe in which the flow is moving is cabled up with respective optical fiber cabling at a plurality of positions around its circumference, and in particular with the intention that a respective cable length is provided for respective phases. Thus, for example, FIG. 18 shows an inhomogenous stratified two-phase gas-liquid flow in a pipe which has been cabled with a first length of helically wrapped fiber in the form of a "flow cable" (as mentioned previously) positioned at a first position (in this case the top surface of the pipe) around the pipe, and a second length of helically wrapped fiber in the form of a flow cable positioned at a second position (in this case the bottom surface of the pipe) around the pipe, in both cases the lengths of fiber running generally parallel to the long axis of the pipe, and connected together in series with a length of fiber. The two series lengths are then connected by further fiber to the DAS system.

In use the first cable, cable 1, on the top of the pipe detects the flow properties of the gas phase, and in particular allows derivation of the flow speed v1 of the gas phase, using the various techniques described above. The second cable, cable 2, located at the bottom of the pipe detects the flow properties of the liquid phase, and allows independent derivation of the flow speed v2 of the liquid phase. The flow speeds may be found using the speed of sound Doppler techniques described above, or by tracking respective eddies in the respective flows of the respective phases, as described above.

The gas void fraction occupied by the gas phase and the water liquid ratio can be found once the cross-section occupied by each phase is determined. The cross-section can be determined by finding the liquid level of the liquid phase, by finding the cut-off frequencies in the dispersion curves of the k-ω plots obtained from the DAS measurements using the flow cables, as described above with respect to FIG. 15. Once the liquid phase level has been found, the gas void fraction, and hence overall composition of the stratified inhomogenous flow can be found, using the techniques described earlier.

With the above arrangement, therefore, additional distributed acoustic sensing data can be gathered from a plurality of points around the pipe, and in particular by providing a respective sensing length of fiber located proximal to where each gas or liquid phase, as appropriate, is expected to be within the pipe. The length of fiber is preferably a helically wound "flow-cable" length, which provides increased spatial sensing resolution along its axial length, but in other embodiments may simply be a respective substantially straight or mildly curved length of fiber, which is not helically wound. The respective lengths of fiber provide respective sets of distributed acoustic sensing data for each location thereof, which can then be processed separately from each other to determine flow properties of the different phases respectively therefrom. It is believed that in some circumstances this may provide for improved performance.

H. Processing System for Flow Monitoring

Figure 13:
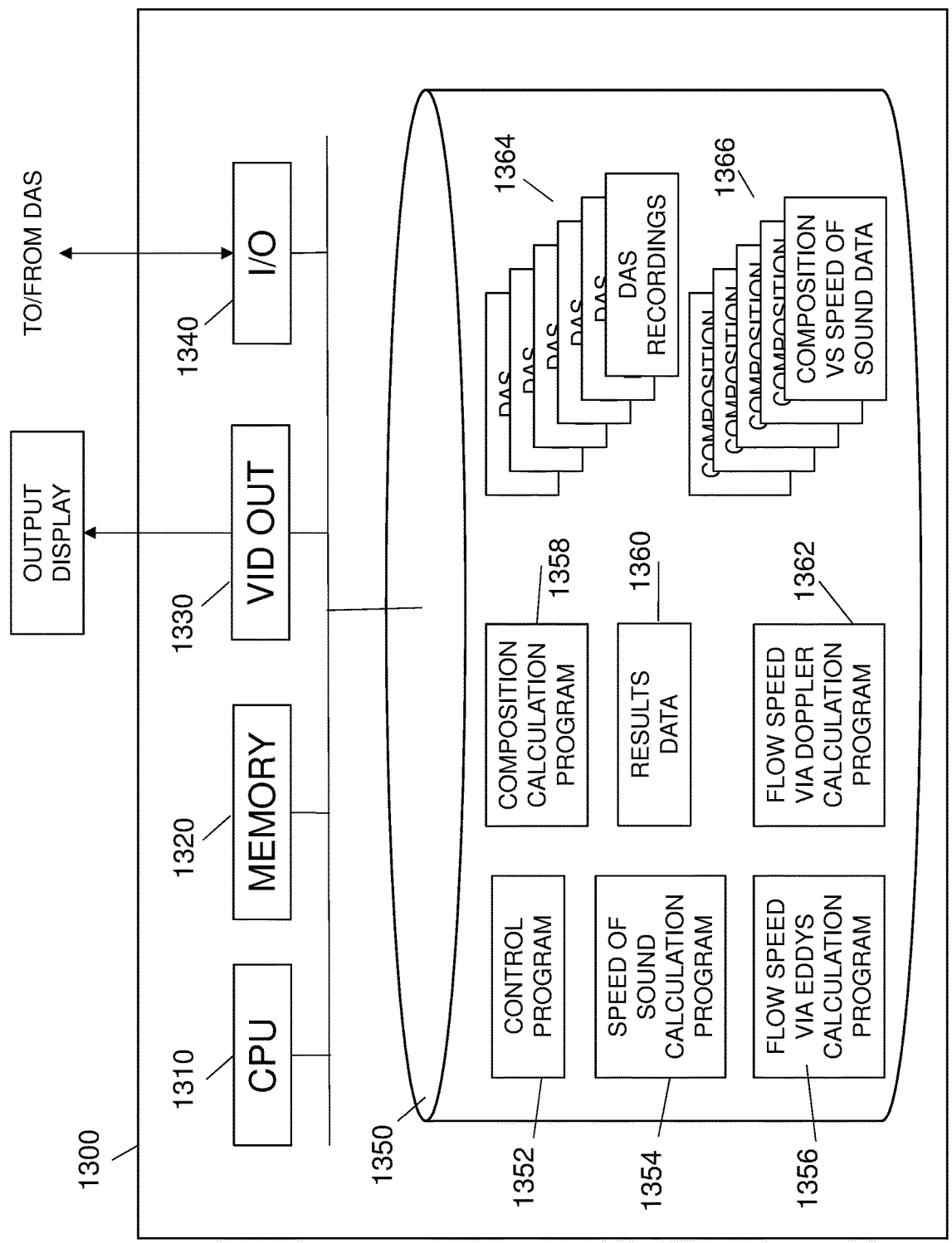
FIG. 13 is a block diagram of an embodiment of the invention.

FIG. 13 is a block diagram of a processing system for processing DAS data to obtain the flow and composition data using the methods described above. General purpose computer system 1300 is provided with a processor 1310, memory 1320, a general input/output interface 1340 for receiving and transmitting data, and a video output interface 1330 that controls an output display. Also provided is computer readable storage medium 1350, such as a hard disk drive (HDD), flash drive, or the like. Stored on the storage medium 1350 is a control program 1352 that provides overall control of the system, as well as speed of sound calculation program 1354, flow speed via eddys program 1356, flow speed via Doppler calculation program 1362, and composition calculation program 1358. Results data 1360 is also stored on the storage medium, corresponding to determined flow rates and compositions for given input data. DAS input traces which are processed by the above programs are stored as DAS recordings 1364, and in addition a number of look-up-tables that relate composition to speed of sound, corresponding to the datasets represented by the graphs shown in FIGS. 8 to 12, are also stored.

Figure 14:
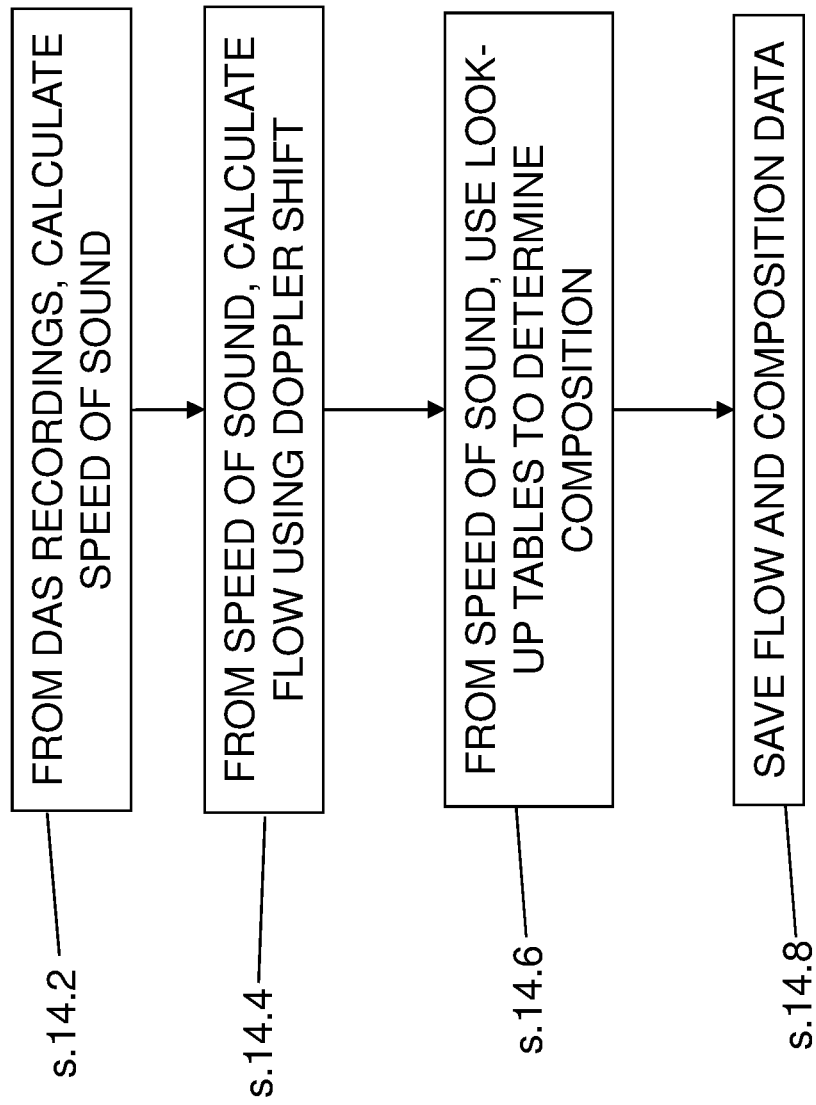
FIG. 14 is a flow diagram illustrating the operation of an embodiment of the invention.

FIG. 14 illustrates one of the methods of operation of the above described processing system. In this example, a DAS recording 1364 is received, and the speed of sound calculation program processes the DAS trace data to determine the speed of sound in both directions. The speed of sound data is then saved. Next, at step 14.4, the flow speed via Doppler calculation program 1362 calculates the flow speed, from Doppler shifts in the speed of sound, as described above. In addition, the speed of sound data is also used as an input into the composition calculation program 1358, which uses the appropriate composition vs speed of sound look up table 1366 to determine the composition from the found speed of sound. Alternatively, the composition calculation program 1358 may also determine the composition for inhomogenous flows using the modal analysis techniques described above, involving looking at the turning points in the dispersion curve.

In this way, the processing system is able to process the DAS traces using the techniques described in more detail above to find both the flow rate and composition of multi-phase flows. Note that the above described processing may be performed dynamically on DAS data as the data is produced by the DAS, in which case flow rate and composition can be provided dynamically in situ, or it may also be performed some time later on recordings of DAS traces. Thus, embodiments of the invention relate to post-processing of DAS data either immediately after it has been captured, or separately some time later after capture.

Various modifications may be made to the above described embodiments to provide further embodiments, any and all of which are intended to be encompassed by the appended claims.

What is claimed is:

1. A method of monitoring multi-phase flow in a structure, comprising:

receiving a set of distributed acoustic data obtained by an optical fiber distributed acoustic sensor arranged to monitor the structure;

from the distributed acoustic data, generating k-ω data in dependence on the distributed acoustic data;

identifying dispersion curves within the k-ω data; and determining a multi-phase composition of the flow in dependence on one or more properties of the identified dispersion curves, wherein determining the multi-phase composition of the flow includes identifying a cut-off frequency from the dispersion curves, wherein a turning point in the dispersion curve is indicative of a cut-off frequency, and applying the identified cut-off frequency to a cut-off frequency look-up table relating dispersion curve cut-off frequency to multi-phase composition to determine the multi-phase composition of the flow.

2. A method according to claim 1, wherein determining the flow speed comprises undertaking a mathematical curve fitting to find a best fit curve that characterises a first order dispersion curve, and determining the flow speed in dependence on at least one of the parameters of best fit curve.

3. A method according to claim 2, wherein the best fit curve is a quadratic curve, the flow speed being determined in dependence on the first order coefficient thereof.

4. A system, comprising:

a processor, and a non-transitive computer readable storage medium storing computer readable instructions so arranged such that when executed by the processor the instructions cause the processor to perform the following receive a set of distributed acoustic data obtained by an optical fiber distributed acoustic sensor arranged to monitor the structure;

from the distributed acoustic data, generate k-ω data in dependence on the distributed acoustic data;

identify dispersion curves within the k-ω data; and determine a multi-phase composition of the flow or changes in the composition of the flow in dependence on one or more properties of the identified dispersion curves, wherein determining the multi-phase composition of the flow includes identifying a cut-off frequency from the dispersion curves, wherein a turning point in the dispersion curve is indicative of a cut-off frequency, and applying the identified cut-off frequency to a cut-off frequency look-up table relating dispersion curve cut-off frequency to multi-phase composition to determine the multi-phase composition of the flow.

\* \* \* \* \*